US012472631B2

(12) United States Patent
Dupree et al.

(10) Patent No.: US 12,472,631 B2
(45) Date of Patent: Nov. 18, 2025

(54) MULTI-PALLET MIXED-CASE ROBOTIC PALLETIZER

(71) Applicant: Dexterity, Inc., Redwood City, CA (US)

(72) Inventors: Andrew Dupree, San Francisco, CA (US); Robert Moreno, Sunnyvale, CA (US); Salvador Perez, Menlo Park, CA (US); William Hyslop, Cincinnati, OH (US); Adam Kell, Millbrae, CA (US); Ben Varkey Benjamin Pottayil, Santa Clara, CA (US)

(73) Assignee: Dexterity, Inc., Redwood City, CA (US)

( * ) Notice: Subject to any disclaimer, the term of this patent is extended or adjusted under 35 U.S.C. 154(b) by 894 days.

(21) Appl. No.: 17/343,606

(22) Filed: Jun. 9, 2021

(65) Prior Publication Data
US 2022/0288787 A1   Sep. 15, 2022

Related U.S. Application Data

(60) Provisional application No. 63/160,236, filed on Mar. 12, 2021.

(51) Int. Cl.
*B25J 9/16* (2006.01)
*B25J 9/00* (2006.01)
(Continued)

(52) U.S. Cl.
CPC ........... *B25J 9/1687* (2013.01); *B25J 9/0093* (2013.01); *B25J 9/0096* (2013.01); *B25J 13/08* (2013.01);
(Continued)

(58) Field of Classification Search
CPC ............... B65G 61/00; B65G 57/00; B65G 2203/0208; B65G 1/1378; B65G 57/22;
(Continued)

(56) References Cited

U.S. PATENT DOCUMENTS 5,908,283 A * 6/1999 Huang ............... G06Q 10/043
414/21
6,290,448 B1 * 9/2001 Focke .................. B65G 57/005
198/374

(Continued)

FOREIGN PATENT DOCUMENTS

JP   H04129925   4/1992

*Primary Examiner* — Timothy R Waggoner
(74) *Attorney, Agent, or Firm* — Van Pelt, Yi & James LLP

(57) ABSTRACT

A robotic system is disclosed. The system includes a communication interface, and one or more processors coupled to the communication interface and configured to: generate based at least in part on the received data a plan to stack the items on or in the destination location. For each item, the generating the plan includes determining the destination location based at least in part on a characteristic associated with the item, and at least one of (i) a characteristic of a platform or receptacle on which one or more items are to be stacked, and (ii) an existing stack of one or more items on the platform or receptacle. The destination location is determined from among a plurality of zones in which platforms or receptacles are disposed, and each of the plurality of zones are within a range of a robotic arm. A robotic arm is controlled to implement the plan.

24 Claims, 17 Drawing Sheets

(51) Int. Cl.
 *B25J 13/08* (2006.01)
 *B65G 61/00* (2006.01)
(52) U.S. Cl.
 CPC ...... *B65G 61/00* (2013.01); *B65G 2203/0208* (2013.01)
(58) Field of Classification Search
 CPC .............. G06Q 10/08; G06Q 10/043; G05B 2219/40006; G05B 19/4182; B25J 9/1687; B25J 9/0093; B25J 9/0096; B25J 13/08
 USPC ........................................................ 700/217
 See application file for complete search history.

(56) References Cited

U.S. PATENT DOCUMENTS

| | | | |
|---|---|---|---|
| 2010/0272552 A1* | 10/2010 | Xu | B25J 9/045 |
| | | | 414/788.1 |
| 2015/0112483 A1* | 4/2015 | Mougin | B25J 9/1676 |
| | | | 901/9 |
| 2018/0086572 A1 | 3/2018 | Kimoto | |
| 2019/0352107 A1* | 11/2019 | Klotz | B65G 57/22 |
| 2020/0223634 A1 | 7/2020 | Arase | |
| 2020/0270071 A1* | 8/2020 | Chavez | B65G 47/905 |
| 2020/0377315 A1 | 12/2020 | Diankov | |

\* cited by examiner

MULTI-PALLET MIXED-CASE ROBOTIC PALLETIZER

CROSS REFERENCE TO OTHER APPLICATIONS

This application claims priority to U.S. Provisional Patent Application No. 63/160,236 entitled MULTI-PALLET MIXED-CASE ROBOTIC PALLETIZER filed Mar. 12, 2021 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of items use strategies such as packing and unpacking dissimilar items in boxes, crates, containers, conveyor belts, and on pallets, etc. Packing dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.).

In some contexts, items may be so dissimilar in size, weight, density, bulkiness, rigidity, strength of packaging, etc. that any given item or set of items may or may not have attributes that would enable those items to support the size, weight, distribution of weight, etc., of a given other item that might be required to be packed (e.g., in a box, container, pallet, etc. When assembling a pallet or other set of dissimilar items, items must be selected and stacked carefully to ensure the palletized stack does not collapse, lean, or otherwise become unstable (e.g., so as not to be able to be handled by equipment such as a forklift, etc.) and to avoid item damage.

Currently, pallets typically are stacked and/or unpacked by hand. Human workers select items to be stacked, e.g., based on a shipping invoice or manifest, etc., and use human judgment and intuition to select larger and heavier items to place on the bottom, for example. However, in some cases, items simply arrive via a conveyor or other mechanism and/or are selected from bins in an order listed, etc., resulting in an unstable palletized or otherwise packed set.

Use of robotics is made more challenging in many environments due to the variety of items, variations the order, number, and mix of items to be packed, on a given pallet for example, and a variety of types and location of container and/or feed mechanism from which items must be picked up to be placed on the pallet or other container.

BRIEF DESCRIPTION OF THE DRAWINGS

Various embodiments of the invention are disclosed in the following detailed description and the accompanying drawings.

DETAILED DESCRIPTION

Figure 1:
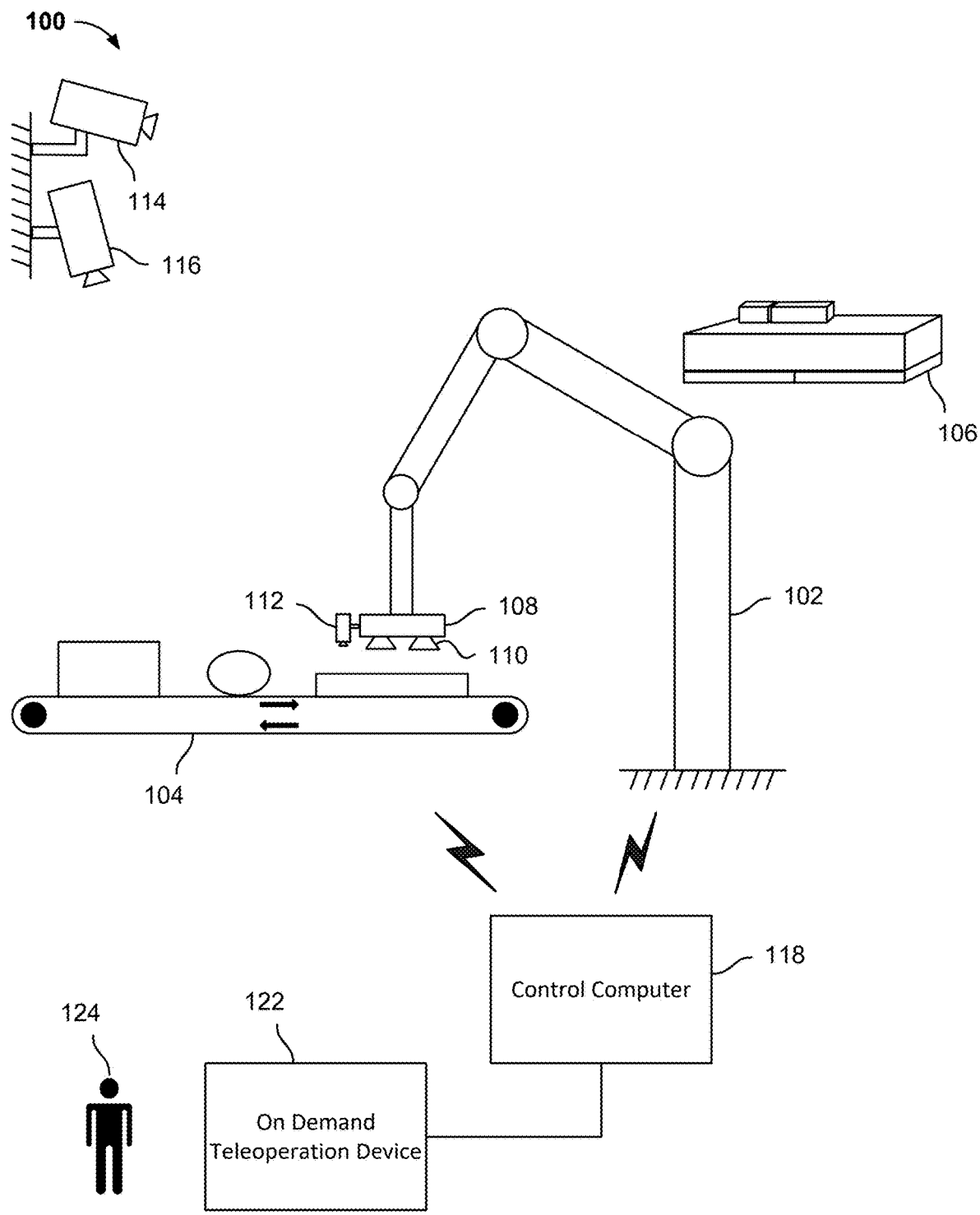
FIG. 1 is a diagram illustrating an embodiment of a robotic system to palletize and/or depalletize heterogeneous items.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, "pallet" includes a platform, receptacle, or other container on, or in, which one or more items may be stacked or placed. Further, as used herein, the pallet may be used in connection with packaging and distributing a set of one or more items. As an example, the term pallet includes the typical flat transport structure that supports items and that is movable via a forklift, a pallet jack, a crane, etc. A pallet, as used herein, may be constructed of various metals including, wood, metals, metal alloys, polymers, etc.

Techniques are disclosed to programmatically use a robotic system comprising one or more robots (e.g., robotic arm with suction, gripper, and/or other end effector at operative end) to palletize/depalletize and/or to otherwise pack and/or unpack arbitrary sets of non-homogeneous items (e.g., dissimilar size, shape, weight, weight distribution, rigidity, fragility, type, packaging, etc.).

In various embodiments, 3D cameras, force sensors, and other sensors and/or sensor arrays are used to detect and determine attributes of items to be picked and/or placed. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used. The sensors and/or sensor arrays may be disposed in or around a workspace of a robotic arm.

In various embodiments, a library of item types, respective attributes, and grasp strategies is used to determine and implement a strategy to pick and place each item. The library is dynamic in some embodiments. For example, the library may be augmented to add newly-encountered items and/or additional attributes learned about an item, such as grasp strategies that worked or did not work in a given context. In some embodiments, human intervention may be invoked if the robotic system gets stuck. The robotic system may be configured to watch (e.g., using sensors) and learn (e.g., updating a library and/or model) based on how a human teleoperator intervenes to use the robotic arm, for example, to pick and place an item via teleoperation. In some embodiments, teleoperation may include higher-level forms of feedback, such as a human indicating a particular point in a 2D RGB image at which the robot should grasp an object.

In some embodiments, a robotic system as disclosed herein may engage in a process to gather and store (e.g., add to library) attributes and/or strategies to identify and pick/place an item of unknown or newly-discovered type. For example, the system may hold the item at various angles and/or locations to enable 3D cameras and/or other sensors to generate sensor data to augment and/or create a library entry that characterizes the item type and stores a model of how to identify and pick/place items of that type.

In various embodiments, a high level plan to pick and place items on or in a pallet is made. Strategies are applied, e.g., based on sensor information, to implement the plan by picking and placing individual items according to the plan. Deviations from the plan and/or re-planning may be triggered, e.g., the robotic system gets stuck, the stack of items on the pallet is detected (e.g., by computer vision, force sensors, etc.) to have become unstable), etc. A partial plan may be formed based on known information (e.g., next N items visible on a conveyor, next N items on an invoice or manifest, etc.) and adjustments made as additional information is received (e.g., next items visible, etc.). In some cases, the system is configured to stage (e.g., set aside, within reach) items determined less likely to be suitable to be stacked in a layer or container the system is currently building, such as a lower (or higher) layer in a pallet or container, etc. Once more information is known about next items to be picked/placed, a strategy that takes into account the staged (buffered) items and next items is generated and implemented.

Various embodiments include the simultaneous (e.g., concurrent or contemporaneous) palletization or depalletization of a set of one or more items. One or more robotic arms may be controlled to concurrently stack (or de-stack) a set of items on a plurality of pallets. For example, a plurality of pallets may be disposed within range of a robotic arm, and the robotic arm may contemporaneously stack one or more items on at least a subset of the plurality of pallets (e.g., a set of two or more pallets). A pallet on which an item is to be placed (e.g., stacked) may be selected based at least in part on one or more of the item (e.g., an attribute of the item, a type of item, etc.), a characteristic of the pallet, an identifier of the pallet, a state of a stack of one or more items on the pallet, a manifest or order (e.g., an order in association with which the item is being packed and shipped), etc. A mix of items may be stacked on one or more pallets of the plurality of pallets.

In various embodiments, a robotic system determines a high level plan to pick an item from a conveyance structure (hereinafter "conveyor") of one or more conveyors, and to place the item on a pallet of one or more pallets disposed within range of a robotic arm. The robotic system determines the pallet on which to place the item. For example, the robotic system determines the pallet on which to place the item based at least in part on an order and/or manifest associated with the pallet. As another example, in the case of a plurality of pallets being delivered to a same address (e.g., a same customer), or being associated with a same manifest or order, the robotic system may determine the pallet on which to place the item based at least in part on a state of the pallet and/or a state of the plurality of pallets. The robotic system may determine a state of a stack on one or more of the plurality of pallets, and determine the pallet on which to place the item based at least in part on a determination of a stack for which the item has a best fit. The determination that the stack for which the item has a best fit may be based at least in part on a stability of the stack, a model of the stack and/or a model of the stack comprising the item (e.g., after the item is placed on the stack), an expected one or more items that remain to be stacked (e.g., based at least in part on an order and/or manifest), etc. One or more attributes or characteristics pertaining to the item may be used in connection with determining the pallet on which to place the item (e.g., a size, shape, type of packaging, type of item, etc. may be used in connection with modelling the stack and/or determining where to place the item on a stack).

In some embodiments, the robotic system determines that place an item in a buffer or predefined staging area. The robotic system may determine that a fit of the item on a stack on one or more pallets associated with the manifest and/or order to which the item corresponds is not currently ideal (e.g., that a threshold fit or threshold stability would not be achieved if the item were to be placed on the stack). Alternatively, or in addition, the robotic system may determine that the item would fit better on the stack after one or more expected items are placed on the corresponding pallet. For example, the robotic system may determine that an expected fit of a current item or expected stability of the stack would be better (e.g., higher than the threshold fit or the threshold stability) if one or more expected items were first placed on the corresponding pallet. As an example, the one or more expected items may be determined based at least in part on one or more items on the conveyor. As another example, the one or more expected items may be determined based at least in part on a manifest and/or order with which the current item is associated. The one or more expected items may be determined based at least in part on a threshold number of subsequent items on the conveyor or to be stacked on the one or more pallets (e.g., to be delivered to the robotic arm for stacking), and/or manifest and/or order with which the current item is associated. The buffer or predefined staging area may correspond to one of the predefined zones disposed within range of the robotic arm. In some embodiments, in response to a determination that the buffer or predefined staging area is full (e.g., a number of items in the buffer/staging area exceeds a threshold number, or that the current item does not fit in the buffer/staging area), the robotic system may determine whether to place the current item or an item currently in the buffer/staging area. The robotic system may determine whether placing an item from the buffer/staging area to a corresponding pallet (e.g., and thereby freeing up space in the buffer/staging area for the current item) would result in a better fit (e.g., a more stable stack) than placing the current item on a pallet. In response to determining that placing an item from the buffer/staging area to a corresponding pallet is expected to result in a better fit, the robotic system controls the robotic arm to pick the item from the buffer/staging area and place the item on a pallet corresponding to a manifest and/or order to which the item belongs. The robotic arm then places the current item in the buffer and/or staging area until the robotic system determines that placing the item on a corresponding stack is ideal (e.g., that a threshold fit or threshold stability would not be achieved if the item were to be placed on the stack).

In some embodiments, a plurality of pallets are arranged around a robotic arm (e.g., within range of the robotic arm so that the robotic arm may stack an item each of the plurality of pallets). Each pallet may be located within a predefined zone within proximity of the robotic arm. The predefined zones may be configured radially around a robotic arm. Markings on the ground may denote a predefined zone. The robotic system may comprise one or more sensors or sensor arrays that obtain information pertaining to one or more of a plurality of predefined zones. The one or more sensors or sensor arrays may obtain information pertaining to a pallet disposed within a predefined zone (e.g., an identifier associated with the pallet, a state of the pallet, etc.) and/or a stack of items on the pallet. For example, the one or more sensors or sensor arrays may obtain information from which a stack of one or more items on the pallet in the predefined zone may be modeled. The robotic system may use the information obtained by the one or more sensors or sensor arrays to determine an orientation of a pallet in a corresponding predefined zone, to determine whether an inserted pallet is properly oriented, or otherwise determine to calibrate the robotic system with respect to the pallet inserted into corresponding predefined zone. As an example, in response to determining that the robotic system is to be calibrated with the respect to the pallet, the robotic system may provide a notification to a terminal that the pallet is to be reoriented (e.g., a notification that requests/alerts a human operator to reorient the pallet). As another example, in response to determining that the robotic system is to be calibrated with the respect to the pallet, the robotic system may determine an offset of a current orientation of the pallet (e.g., with respect to a proper orientation of the pallet), and determine a plan or strategy for placing items on the pallet based at least in part on the offset of the current orientation.

The interaction between robotic systems (e.g., robotic arms) and human operators invokes safety concerns. Various embodiments ensure safe and intuitive interactions between human operators and robotic systems (e.g., such as while the robotic systems operate at least semi-autonomously). In the case of a robotic system that simultaneously (e.g., concurrently or contemporaneously) stacks items on various pallets arranged in predefined zones around a robotic arm, the robotic system controls the robotic arm to pause or stop the stacking of items in or around human operators and/or pallets that are being removed from a corresponding predefined zone. The one or more sensors and/or sensor arrays operatively connected to the robotic system may obtain information from which the robotic system determines that a human operator is within a predefined zone, within a threshold range of a predefined zone, or other defined area. In response to determining a location of a human operator, the robotic system controls the robotic arm to pause or stop stacking items within a predefined area or range of the location of the human operator. In some examples, the robotic system pauses the robotic arm entirely (e.g., so that the robotic arm does not stack items on any pallets) while the human operator is within a threshold area or range of a predefined zone and/or the robotic arm. In other examples, the robotic system controls the robotic arm to pause or stop stacking items on pallets within predefined zones that are adjacent to a predefined zone in which a human operator is present. In other examples, the robotic system controls the robotic arm to pause or stop stacking items on pallets within predefined zones that are within a threshold distance of a predefined zone in which a human operator is present.

According to various embodiments, the robotic system comprises a control computer that operatively controls a robotic arm to palletize/de-palletize one or more items. A human operator may provide the control computer with instructions via a user interface (e.g., a user interface at a terminal connected to the control computer or directly to the control computer). The user interface may include one or more selectable elements with corresponding functions that are invoked in response to user selection thereof. For example, the user interface may include a button to activate stacking of one or more items on a pallet disposed in a corresponding predefined zone. In response to a pallet being inserted into the predefined zone, the user may input selection of the button to activate stacking on the pallet. As another example, the user interface may include a button to pause stacking of items on the pallet in the corresponding zone. The user may pause stacking of the items on the pallet if a human operator or other robot is within (or within a threshold range of), or will be within, the corresponding predefined zone. In some instances, the user may pause stacking of items on the pallet if the human operator or other robot is within (or will be within) an adjacent predefined zone (or otherwise within proximity of the predefined zone for which items are being, or are to be, stacked.

The user interface may display information pertaining to a current state or status of one or more pallets in corresponding predefined zones (e.g., the state/status of a stacking of items on the pallets). For example, the information pertaining to the current state or status of the one or more pallets may be based at least in part on feedback from the control computer. The feedback from the control computer may be generated based at least in part on information obtained from one or more sensors or sensors arrays within the workspace of the robotic arm (e.g., a plurality of predefined zones). The information pertaining to a current state or status of the one or more pallets may indicate a remaining number of items to be stacked on a pallet in a corresponding predefined zone, a number of items that have been stacked on a pallet, etc.

FIG. 1 is a diagram illustrating an embodiment of a robotic system to palletize and/or depalletize heterogeneous items.

In the example shown, system 100 includes a robotic arm 102. In this example the robotic arm 102 is stationary, but in various alternative embodiments robotic arm 102 may be a fully or partly mobile, e.g., mounted on a rail, fully mobile on a motorized chassis, etc. As shown, robotic arm 102 is used to pick arbitrary and/or dissimilar items from a conveyor belt (or other source) 104 and stack them on a pallet (e.g., platform or other receptacle) 106. The pallet (e.g., platform or other receptacle) 106 may comprise a pallet, a receptacle, or base with wheels at the four corners and at least partially closed on three of four sides, sometimes referred to as a three-sided "roll pallet", "roll cage", and/or "roll" or "cage" "trolley". In other embodiments, a roll or non-wheeled pallet with more, fewer, and/or no sides may be used. In some embodiments, other robots not shown in FIG. 1 may be used to push receptacle 106 into position to be loaded/unloaded and/or into a truck or other destination to be transported, etc.

In some embodiments, a plurality of pallets 106 may be disposed around robotic arm 102 (e.g., within a threshold proximity or otherwise within range of the robotic arm). The robotic arm 102 may simultaneously (e.g., concurrently and/or contemporaneously) stack one or more items on the plurality of pallets. Each of the plurality of pallets may be associated with a manifest and/or order. For example, each of the pallets may be associated with a preset destination (e.g., customer, address, etc.). In some instances, a subset of the plurality of pallets may be associated with a same manifest and/or order. However, each of the plurality of pallets may be associated with different manifests and/or orders. Robotic arm 102 may place a plurality of items respectively corresponding to a same order on a plurality of pallets. Robotic system 100 may determine an arrangement (e.g., a stacking of items) on the plurality of pallets (e.g., how the plurality of items for an order are to be divided among the plurality of pallets, how the items on any one pallet are to be stacked, etc.). System 100 may store one or more items (e.g., item(s) for an order) in a buffer or staging area while one or more other items are stacked on a pallet. As an example, the one or more items may be stored in the buffer or staging area until such time that the system 100 determines that the respective placement of the one or more items on the pallet (e.g., on the stack) satisfies (e.g., exceeds) a threshold fit or threshold stability. The threshold fit or threshold stability may be a predefined value or a value that is empirically determined based at least in part on historical information. A machine learning algorithm may be implemented in connection with determining whether placement of an item on a stack would is expected to satisfy (e.g., exceeds) a threshold fit or threshold stability, and/or in connection with determining the threshold fit or threshold stability (e.g., the thresholds against which a simulation or model are measured to assess whether to place the item on the stack).

In the example shown, robotic arm 102 is equipped with a suction-type end effector 108. End effector 108 has a plurality of suction cups 110. Robotic arm 102 is used to position the suction cups 110 of end effector 108 over an item to be picked up, as shown, and a vacuum source provides suction to grasp the item, lift it from conveyor 104, and place it at a destination location on pallet 106.

In various embodiments, one or more of 3D or other camera 112 mounted on end effector 108 and cameras 114, 116 mounted in a space in which robotic system 100 is deployed are used to generate image data used to identify items on conveyor 104 and/or determine a plan to grasp, pick/place, and stack the items on pallet 106 (or place the item in the buffer or staging area, as applicable). In various embodiments, additional sensors not shown, e.g., weight or force sensors embodied in and/or adjacent to conveyor 104 and/or robotic arm 102, force sensors in the x-y plane and/or z-direction (vertical direction) of suction cups 110, etc. may be used to identify, determine attributes of, grasp, pick up, move through a determined trajectory, and/or place in a destination location on or in receptacle 106 items on conveyor 104 and/or other sources and/or staging areas in which items may be located and/or relocated, e.g., by system 100.

In the example shown, camera 112 is mounted on the side of the body of end effector 108, but in some embodiments camera 112 and/or additional cameras may be mounted in other locations, such as on the underside of the body of end effector 108, e.g., pointed downward from a position between suction cups 110, or on segments or other structures of robotic arm 102, or other locations. In various embodiments, cameras such as 112, 114, and 116 may be used to read text, logos, photos, drawings, images, markings, barcodes, QR codes, or other encoded and/or graphical information or content visible on and/or comprising items on conveyor 104.

Referring further to FIG. 1, in the example shown system 100 includes a control computer 118 configured to communicate, in this example via wireless communication (but in one or both of wired and wireless communication in various embodiments) with elements such as robotic arm 102, conveyor 104, effector 108, and sensors, such as camera 112, 114, and 116 and/or weight, force, and/or other sensors not shown in FIG. 1. In various embodiments, control computer 118 is configured to use input from sensors, such as camera 112, 114, and 116 and/or weight, force, and/or other sensors not shown in FIG. 1, to view, identify, and determine one or more attributes of items to be loaded into and/or unloaded from receptacle 106. In various embodiments, control computer 118 uses item model data in a library stored on and/or accessible to control computer 118 to identify an item and/or its attributes, e.g., based on image and/or other sensor data. Control computer 118 uses a model corresponding to an item to determine and implement a plan to stack the item, along with other items, in/on a destination, such as receptacle 106. In various embodiments, the item attributes and/or model are used to determine a strategy to grasp, move, and place an item in a destination location, e.g., a determined location at which the item is determined to be placed as part of a planning/replanning process to stack items in/on the receptacle 106.

In the example shown, control computer 118 is connected to an "on demand" teleoperation device 122. In some embodiments, if control computer 118 cannot proceed in a fully automated mode, for example, a strategy to grasp, move, and place an item cannot be determined and/or fails in a manner such that control computer 118 does not have a strategy to complete picking and placing the item in a fully automated mode, then control computer 118 prompts a human user 124 to intervene, e.g., by using teleoperation device 122 to operate the robotic arm 102 and/or end effector 108 to grasp, move, and place the item.

A user interface pertaining to operation of system 100 may be provided by control computer 118 and/or teleoperation device 122. The user interface may provide a current status of system 100, including information pertaining to a current state of the pallet (or stack of items associated therewith), a current order or manifest being palletized or de-palletized, a performance of system 100 (e.g., a number of items palletized/de-palletized by time), etc. A user may select one or more elements on the user interface, or otherwise provide an input to the user interface, to activate or pause system 100 and/or a particular robotic arm in system 100.

According to various embodiments, system 100 implements a machine learning process to model a state of a pallet such as to generate a model of a stack on the pallet. The machine learning process may include an adaptive and/or dynamic process for modeling the state of the pallet. The machine learning process may define and/or update/refine a process by which system 100 generates a model of the state of the pallet. The model may be generated based at least in part on input from (e.g., information obtained from) one or more sensors in system 100 such as one or more sensors or sensor arrays within workspace of robot 102. The model may be generated based at least in part on a geometry of the stack, a vision response (e.g. information obtained by one or more sensors in the workspace), and the machine learning processes, etc. System 100 may use the model in connection with determining an efficient (e.g., maximizing/optimizing an efficiency) manner for palletizing/de-palletizing one or more items, and the manner for palletizing/de-palletizing may be bounded by a minimum threshold stability value. The process for palletizing/de-palletizing the one or more items may be configurable by a user administrator. For example, one or more metrics by which the process for palletizing/de-palletizing is maximized may be configurable (e.g., set by the user/administrator).

In the context of palletizing one or more items, system 100 may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the destination location. System 100 may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. System 100 may select a destination location for which the expected fit and/or expected stability satisfies (e.g., exceeds) a corresponding threshold value. Additionally, or alternatively, system 100 may select a destination location that optimizes the expected fit (e.g., of the item on the stack) and/or expected stability (e.g., of the stack).

Conversely, in the context of de-palletizing one or more items from a pallet (e.g., a stack on the pallet), system 100 may generate the model of the state of the pallet in connection with determining whether to remove an item on the pallet (e.g., on the stack), and selecting a plan for removing the item from the pallet. The model of the state of the pallet may be used in connection with determining an order in which items are removed from the pallet. For example, system 100 may use the model to determine whether removal of an item is expected to cause stability of the state of the pallet (e.g., the stack) to drop below a threshold stability. System 100 may simulate removal of one or more items from the pallet and select an order from removing items from the pallet that optimizes the stability of the state of the pallet (e.g., the stack). System 100 may use the model to determine a next item to remove from the pallet. For example, system 100 may select an item as a next item to remove from the pallet based at least in part on a determination that an expected stability of the stack during and/or after removal of the item exceeds a threshold stability. The model and/or the machine learning process may be used in connection with determining strategies for picking an item from the stack. For example, after an item is selected to be the next item to remove from the stack, system 100 may determine the strategy for picking the item. The strategy for picking the item may be based at least in part on the state of the pallet (e.g., a determined stability of the stack), an attribute of the item (e.g., a size, shape, weight or expected weight, center of gravity, type of packaging, etc.), a location of the item (e.g., relative to one or more other items in the stack), an attribute of another item on the stack (e.g., an attribute of an adjacent item, etc.), etc.

According to various embodiments, a machine learning process is implemented in connection with improving grasping strategies (e.g., strategies for grasping an item). System 100 may obtain attribute information pertaining to one or more items to be palletized/de-palletized. The attribute information may comprise one or more of an orientation of the item, a material (e.g., a packaging type), a size, a weight (or expected weight), or a center of gravity, etc. System 100 may also obtain a source location (e.g., information pertaining to the input conveyor from which the item is to be picked), and may obtain information pertaining to a pallet on which the item is to be placed (or set of pallets from which the destination pallet is to be determined such as a set of pallets corresponding to the order for which the item is being stacked). In connection with determining a plan for picking and placing the item, system 100 may use the information pertaining to the item (e.g., the attribute information, destination location, etc.) to determine a strategy for picking the item. The picking strategy may include an indication of a picking location (e.g., a location on the item at which the robotic arm 102 is to engage the item such as via the end effector). The picking strategy may include a force to be applied to pick the item and/or a holding force by which the robotic arm 102 is to grasp the item while moving the item from a source location to the destination location. System 100 may use machine learning processes to improve the picking strategies based at least in part on an association between information pertaining to the item (e.g., the attribute information, destination location, etc.) and performance of picking the item (e.g., historical information associated with past iterations of picking and placing the item or similar items such as items sharing one or more similar attributes).

Figure 2:
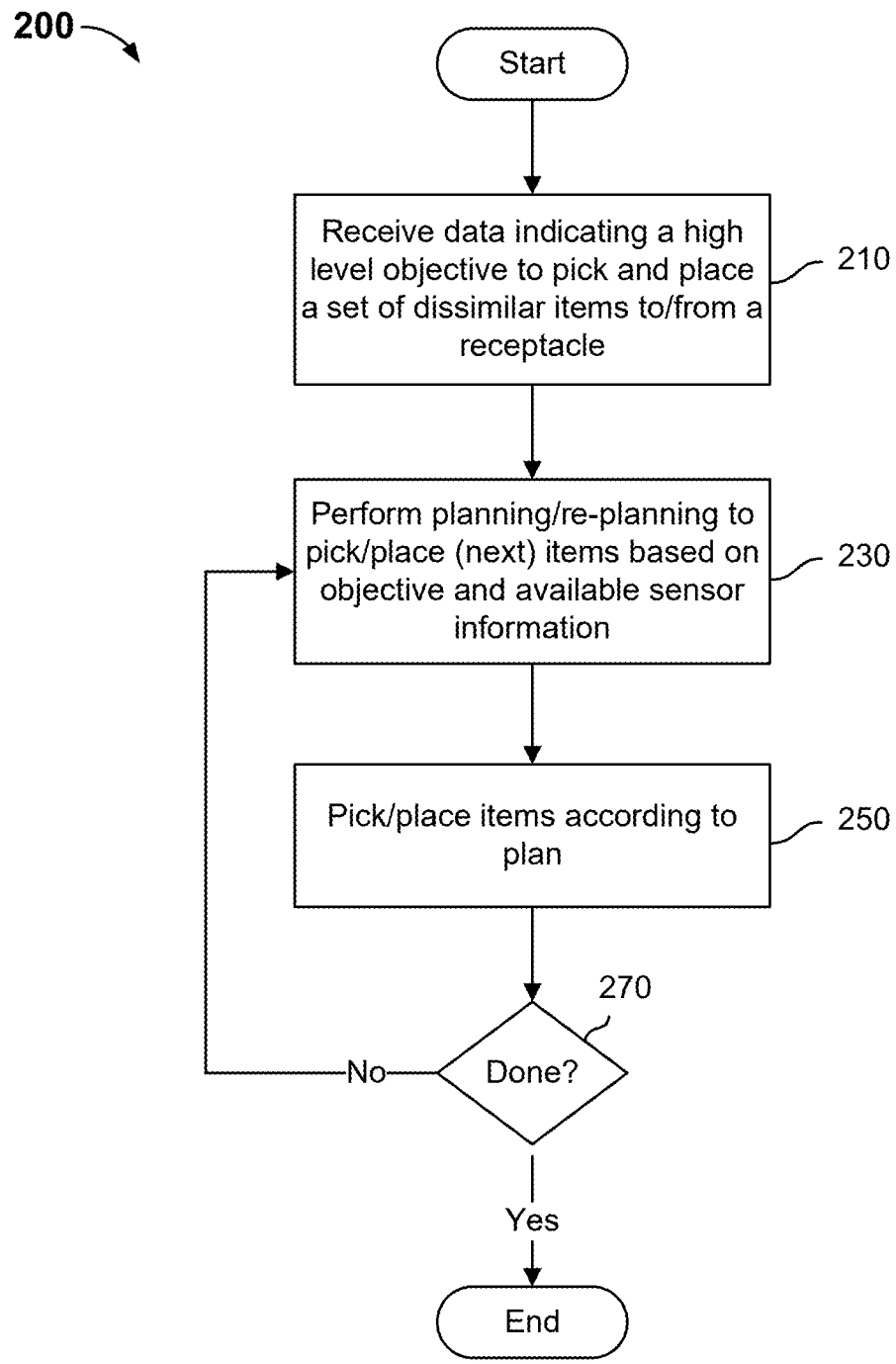
FIG. 2 is a flow chart illustrating an embodiment of a process to palletize and/or depalletize.

FIG. 2 is a flow chart illustrating an embodiment of a process to palletize and/or depalletize. In various embodiments, the process 200 of FIG. 2 is performed by a control computer comprising a robotic system to palletize and/or depalletize heterogeneous items, such as control computer 118 of FIG. 1. The robotic system may comprise one or more robotic arms. One or more pallets may be disposed around each of the robotic arms. For example, a plurality of predefined zones may be set within proximity or within a threshold range of a robotic arm, and at least pallet may be placed in a predefined zone. As another example, a plurality of predefined zones may be set radially around a robotic arm, and a plurality of pallets may be respectively located in a corresponding predefined zone. A system may comprise one or more conveyors that carry items to/from a workspace for a robotic arm (e.g., at least part of the one or more conveyors may be within reach/range of the robotic arm).

In the example shown, at 210 data indicating a high level objective to pick and place a set of dissimilar items (i.e., the set includes two or more different types of item) to/from one or more platforms or receptacles, such as a pallet, is received. For example, a control computer such as control computer 118 of FIG. 1 may receive an input to load items arriving on conveyor 104 onto pallet 106. Conversely, as another example, a control computer such as control computer 118 of FIG. 1 may receive an input to unload items from pallet 106 onto conveyor 104. The input may correspond to a user selection via a user interface such as interface 1300 of FIG. 13A. The input to load/unload items correspond to a particular pallet or a particular robotic arm. For example, in the case of a plurality of pallets corresponding to the robotic arm (e.g., located within the predefined zones associated with the robotic arm), the user may selectively instruct the robotic arm to load/unload items on a pallet-by-pallet basis (e.g., for each pallet individually). As another example, in the case of a plurality of pallets corresponding to the robotic arm, the user may selectively instruct the robotic arm to load/unload a subset of the pallets, or all the pallets, corresponding to the robotic arm.

According to various embodiments, an input indicating explicitly the items expected and/or desired to be loaded, such as an invoice or manifest, may be received. For example, in response to receiving an order or an instruction to fulfill an order, a manifest or listing of items corresponding to the order may be generated (hereinafter referred to as the "manifest"). In connection with fulfillment of the order, the robotic system may be instructed to palletize the items corresponding to the manifest. Palletizing the items for the manifest may include stacking items on one or more pallets. In the case of a plurality of pallets disposed within predefined zones corresponding to the robotic arm, the robotic arm may simultaneously (e.g., concurrently and/or contemporaneously) stack items corresponding the manifest on a plurality of pallets.

A pallet may have an identifier thereon and the robotic system may associate the identifier of the pallet with a manifest. For example, the robotic system may store (or have access to) a data storage that stores mappings of pallet identifiers to manifests. As another example, the predefined zone may be temporarily associated with a manifest. The association between the predefined zone and the manifest may be stored in a mapping of predefined zones to manifests. The robotic system may use the association between a manifest and a pallet identifier or predefined zone in which the pallet is located in connection with placing an item on a pallet. The simultaneous (e.g., concurrent or contemporaneous) stacking of items on a plurality of pallets corresponding to the same manifest provides greater flexibility in planning the manner by which items are to be stacked on a pallet. For example, the robotic system can determine the pallet on which the item fits best (e.g., results in a most efficiently packed stack and/or results in a better stack stability metric).

At 230, planning (or re-planning) is performed to generate a plan to pick/place items based on the high level objective received at 210 and available sensor information. For example, in the example shown in FIG. 1, 3D or other image data generated by one or more of cameras 112, 114, and 116 may be used, along with sensor data from sensors not shown in FIG. 1 (e.g., weight sensors) to identify and determine a plan to pick, place, and stack on receptacle 106 items arriving via conveyor 104.

In some embodiments, the system may make a plan based at least in part on a manifest (e.g., invoice or other list corresponding to an order, etc.). A plan to stack items may be generated based on item size, weight, density, weight distribution, rigidity, capacity of the item and/or its box or other packaging to support weight stacked on top of the item, etc. The control computer in some embodiments controls the order in which items arrive at the loading location, such as via conveyor 104. In some embodiments, items may arrive in an order not known a priori and/or the list of items may not be known. In some such embodiments, cameras (e.g., 112, 114, 116) and/or other sensors are used to identify items and/or their attributes, generate/update a plan to stack items on a pallet (e.g., pallet 106), and/or to determine strategies to grasp, pick up, move, and place each item in its corresponding place according to the stacking plan determined at 230.

According to various embodiments, the robotic system determines the plan to pick/place the item in order to pack or stack the items in a manner that the pallets are stable and packed densely. As an example, one or more thresholds pertaining to the manner by which items are packed or stacked on a pallet may be used in connection with determining the plan to pick/place the item. The one or more thresholds may be set by a user (e.g., an administrator). In some embodiments, a threshold may be set based on a machine learning process such as a machine learning process that improves planning process such as based at least in part on historical information (e.g., historical information pertaining to the stacking of items on a pallet, or of the individual placement/attributes of an item). The one or more thresholds may include (i) a packing efficiency threshold pertaining to a measure of packing density of a pallet, (ii) a stability threshold pertaining to a measure of a stability of the stack of items on the pallet, (iii) a fit threshold pertaining to a measure of the manner by which an item fits on the pallet (e.g., on an existing stack, etc.). The robotic system may use the thresholds as respective minimum values that must be obtained (or expected to be obtained) by the expected placement of the item at a particular destination location.

In some embodiments, a model of items on a pallet may be generated. For example, the model may be generated for the stack of items on a pallet. The model may be updated as a new item is added to the pallet (e.g., placed on the pallet). Alternatively, or additionally, the model may be updated at predefined time intervals that may be configurable by a user/administrator. The model of items with respect to a particular pallet may be modeled each time an item is determined to be picked/placed by a robotic arm, and/or each time the robotic system determines that the item is associated with a manifest corresponding to one or more pallets. However, in some embodiments, the model of items with respect to a pallet may be cached and obtained in response to a determination that an item associated with a manifest corresponding to the item. The robotic system may obtain the cached model and update the model in response to a determination that one or more other items have been placed on the pallet since the model was generated. In some embodiments, the robotic system updates and caches the model after the robotic arm places an item on the pallet to avoid the model having to be computed/updated at a time that a next item is to be placed on the pallet.

In response to determining that an items is to be picked and placed on a pallet, the robotic system may determine a set of pallets on which the item may be placed based at least in part on a determination of a manifest with which the item is associated. In response to determining the manifest corresponding to the item, the robotic system may perform a lookup in a mapping of manifests to pallets to determine one or more pallets on which the item may be placed to allow the item to be included in the fulfillment of the manifest. In some cases, all of the one or more pallets are within range of a particular robotic arm (e.g., are within the predefined zones corresponding to the robotic arm). In other cases, a subset of the one or more pallets are within range of a particular robotic arm (e.g., a subset of the one or more pallets may not yet be placed in a zone for any robotic arm, and/or a subset of the one or more pallets may be placed in a predefined zone corresponding to a different robotic arm). Accordingly, the robotic system may further determine the one or more pallets on which the item may be placed by the robotic arm based on the mapping of manifests to pallets, and/or a mapping of pallets to robotic arms and/or predefined zones.

In response to determining that the item may be placed on one or more pallets corresponding to a robotic arm, the robotic system may determine the manner by which the item is to be placed on the one or more pallets. A pallet may correspond to a robotic arm if the pallet is currently in a predefined zone for the robotic arm. As an example, if the item may be placed on one of a plurality of pallets corresponding to a robotic arm, the robotic system may select one of the plurality of pallets on which to place the item. Selection of the pallet on which to place the item may include determining a pallet or stack on which the item is best fit (e.g., relative to the placing of the item on other pallets/stacks). In some embodiments, the robotic system uses the corresponding models of items with respect to the pallets in connection with determining the pallet or stack on which to place the item. For example, the robotic system may simulate/model the placing of the item on one or more of the pallets on which the item may be placed, and determine one or more expected characteristics associated with the pallet or items on the pallet if the item were placed on the pallet. The one or more characteristics associated may comprise one or more of a metric pertaining to a stability of the items on the pallet (e.g., a stability of the stack of item), a metric pertaining to a density of the items on the pallet, a fit of the item relative to other items on the pallet, etc.

In some embodiments, the robotic system simulates placing the item a different locations on a particular pallet to determine a location at which the item best fits based at least in part on at least a subset of the aforementioned one or more characteristics. The robotic system may simulate placing the item at a plurality of locations with respect to a particular pallet, and may perform such a simulation with respect to a plurality of the pallets on which the item may be placed (e.g., a plurality of pallets associated with the manifest to which the item belongs). The robotic system may determine the destination location of the item based at least in part on the one or more simulations of placing the item. For example, the robotic system may determine the destination location based at least in part on the expected one or more characteristics associated with placing an item at the various locations according to the one or more simulations. A composite score associated with placing an item at a particular location may be determined based at least in part on the one or more characteristics (e.g., density of the stack, stability of the stack, fit of the item relative to other items, etc.). In some embodiments, the one or more characteristics have corresponding weightings used in determining a composite score associated with placing the item at a particular location.

The robotic system may determine the destination location as corresponding to location having the highest corresponding composite score among the different simulations/models for placing the item on the pallet. In some embodiments, the destination location is determined based at least in part on the simulations and a cost function. For example, a set of destination locations for which the composite score satisfies (e.g., exceeds) a threshold value may be determined, and the robotic system may select, from among the set of destination locations, the destination location having the most efficient result (e.g., lowest cost) with respect the cost function as the destination location at which the item is to be placed. In some embodiments, the set of destination locations from which the destination location is selected is determined based at least in part on (i) each of the destination locations having characteristics that satisfy minimum characteristic values (e.g., characteristic values for fit, stability, efficiency, etc.), and (ii) each of the destination locations having a composite score that satisfies the threshold composite score value.

The stability of the items on a pallet may be impacted by one or more attributes associated with an item. The attributes may include a shape of an item, a center of gravity of an item (or an expected center of gravity of the item), a type of packing (e.g., a cardboard box, a polybag, etc.), a weight of the item, an indication that the item is fragile, etc. As an example, an item that is relatively light or an irregular shaped item may cause a stack of items to be relatively unstable if the item is placed at a lower part of the stack. In the case of an item that is a pillow, the stability of a stack of items may be improved by placing the pillow at the top or near the top of the stack compared to placement of the pillow at the bottom or near the bottom/middle of the stack. The robotic system may obtain one or more attributes associated with an item. For example, the robotic system may obtain the one or more attributes when the item is provided on the conveyor (e.g., as the item is brought within proximity of the robotic arm), or when the item is determined to be the next item to be picked up from the conveyor. In some embodiments, the obtaining the one or more attributes comprises obtaining (e.g., scanning) one or more identifiers on the item, such as a bar code, a QR code, a near field communication label/tag, etc. Attributes may be pre-stored in association with the item, the type of item, etc. For example, in response to obtaining an identifier associated with the item, the robotic system may perform a look up against a mapping of items (or identifiers of items) to attributes. In some embodiments, an attribute is obtained by one or more upstream sensors or computers and stored in association with the item. The robotic system may retrieve from a data structure the attributes associated with an item that were obtained by the one or more upstream sensors. A sensor or sensor array may be used in connection with determining a size of the item. The sensor or sensor array may be dispose on or around the conveyor, or within the workspace of the robotic arm. Additionally, or alternatively, the robotic system may determine one or more attributes associated with the item in response to picking up the item. For example, a weight of the item may be determined in response to picking up the item via one or more sensors such as a force sensor, or a current sensor, or other sensor that measures an amount of work expended to lift the item, etc. As another example, the robotic arm may move the item within a threshold range/area of one or more sensors that may obtain an identifier associated with the item (e.g., a barcode on the item), and the identifier may be used to obtain a pre-stored attribute.

The one or more attributes associated with an item may be used to determine the plan for picking/placing the item. For example, the robotic system may determine a trajectory along which the item is to be moved from a source location (e.g., a location on the conveyor) to the destination location (e.g., the location on the pallet on which the item is to be placed). As another example, the one or more attributes associated with the item may be used in connection with determining the destination location as simulating the placing of the item at different locations on the pallet, or at different locations on different pallets for the corresponding manifest.

In some embodiments, the robotic system determines the plan for picking/placing the item based on an efficiency or cost function associated moving the item from the source location to the destination location. As an example, the robotic system may determine the plan based on an optimization of the efficiency or cost function. As another example, the robotic system may determine the plan such that a minimum efficiency threshold and/or a minimum value threshold of a cost function is satisfied by the corresponding moving of the item from the source location to the destination location. One or more values pertaining to an efficiency of a plan may include an expected time for the robotic arm to move the item, a difference in height between the source location and the destination location, a distance (e.g., a Euclidian distance, etc.) between the source location and the destination location, etc. In some embodiments, a cost function comprises one or more variables pertaining to the picking/placing of the item at the destination location, an expected stability of the stack of items on the pallet (e.g., after the item is placed at the destination location), a measure of fit of the item at the destination location, a number of pallets to be used to palletize all items corresponding to a particular manifest, etc. The cost function may include one or more weightings for the one or more variables included in the cost function. The one or more variables used in the cost function may include one or more of item size, item weight, item packaging type, item rigidity, flatness and/or surface uniformity of a destination location surface, a characteristic of item(s) at the destination location (size, weight, packaging types, rigidity, etc.), etc.

In some embodiments, a pallet may be deemed to correspond to a robotic arm if the pallet is currently in a predefined zone for the robotic arm and/or planned to be inserted into a predefined zone at a future time when a predefined zone is available. In such as case, the robotic system may determine that the item is to be placed on such a to-be inserted pallet, and the robotic system may determine the plan for picking and placing the item to comprise picking the item from the conveyor and placing the item in a buffer or staging area until such time that the corresponding pallet is inserted into the predefined zone and the item is determined to be placed on such pallet.

In some embodiments, in response to determining that no suitable locations on one or more pallets corresponding manifest to which the item belongs currently exist, the robotic system may determine to pick and place the item in a buffer or a staging area. The buffer or staging area may be a preset area within the workspace in which items are at least temporarily stored until the robotic system determines that an ideal location on one of the one or more pallets exists (e.g., a location for which criteria pertaining to stability, fit, and/or efficiency, etc. are satisfied). The robotic system may determine that placing one or more upstream items (e.g., items to be delivered via the conveyor within a threshold time and/or threshold number of items) on the pallet before the current item would result in a better stack (e.g., better fit, stability, efficiency, etc.). In response to such a determination, the robotic structure may control the robotic arm to pick and place the one or more upstream items before picking and placing the current item. As an example, the current item may be moved temporarily to the buffer/staging area while, or until such time that, the robotic arm stacks the one or more upstream items.

According to various embodiments, a set of paths or trajectories for picking and placing an item is determined, and the path or trajectory along which the item is to be moved is selected from the set of paths or trajectories. The path or trajectory may be selected based on various properties associated with the corresponding paths or trajectories within the set. Examples of the properties associated with the corresponding paths or trajectories that may be used in connection with selecting the path or trajectory include a speed with which the item is to be moved, a destination location at which the item is to be picked, a probability of success that the item is to picked and placed at the destination location according to the particular path or trajectory, an indication of whether another item or object within the workspace intersects with the particular path or trajectory, an indication that a region or area in the workspace is restricted intersects with the particular path or trajectory, etc. In some embodiments, the probability of success that the item is to be picked and placed at the destination location according to the particular path or trajectory is determined for at least a subset of the set of paths or trajectories, and the path or trajectory is selected based on the corresponding probability of success relative to the probability of success corresponding to other paths or trajectories. As an example, the path or trajectory is selected in response to determining that the probability of success corresponding to the path or trajectory exceeds a threshold probability, or exceeds a threshold number or percentage of other paths or trajectories within the subset.

At 250, items are picked (e.g., grasped from conveyor 104, in the example shown in FIG. 1), moved through a (predetermined/planned) trajectory to a location near where the item is to be placed, and placed at the destination location according to the plan determined and/or updated at 230.

In various embodiments, a packing plan may include planned use of stackable trays, crates, boxes, bins, or other containers to group smaller and/or irregularly-shaped items and pack as a more readily stacked unit. In some embodiments, in a depalletizing operation a robotic system as disclosed herein is configured to recognize such containers, open them if needed, and empty them by removing individual items. Once emptied, the container is moved to a staging location, from which in various embodiments other robots and/or human workers may retrieve and move them out of the way.

In the example shown, (re-)planning and plan implementation (230, 250) continue until the high level objective (210) is completed (270), at which the process 200 ends. In various embodiments, re-planning (230) may be triggered by conditions such as arrival of an items that is not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 3:
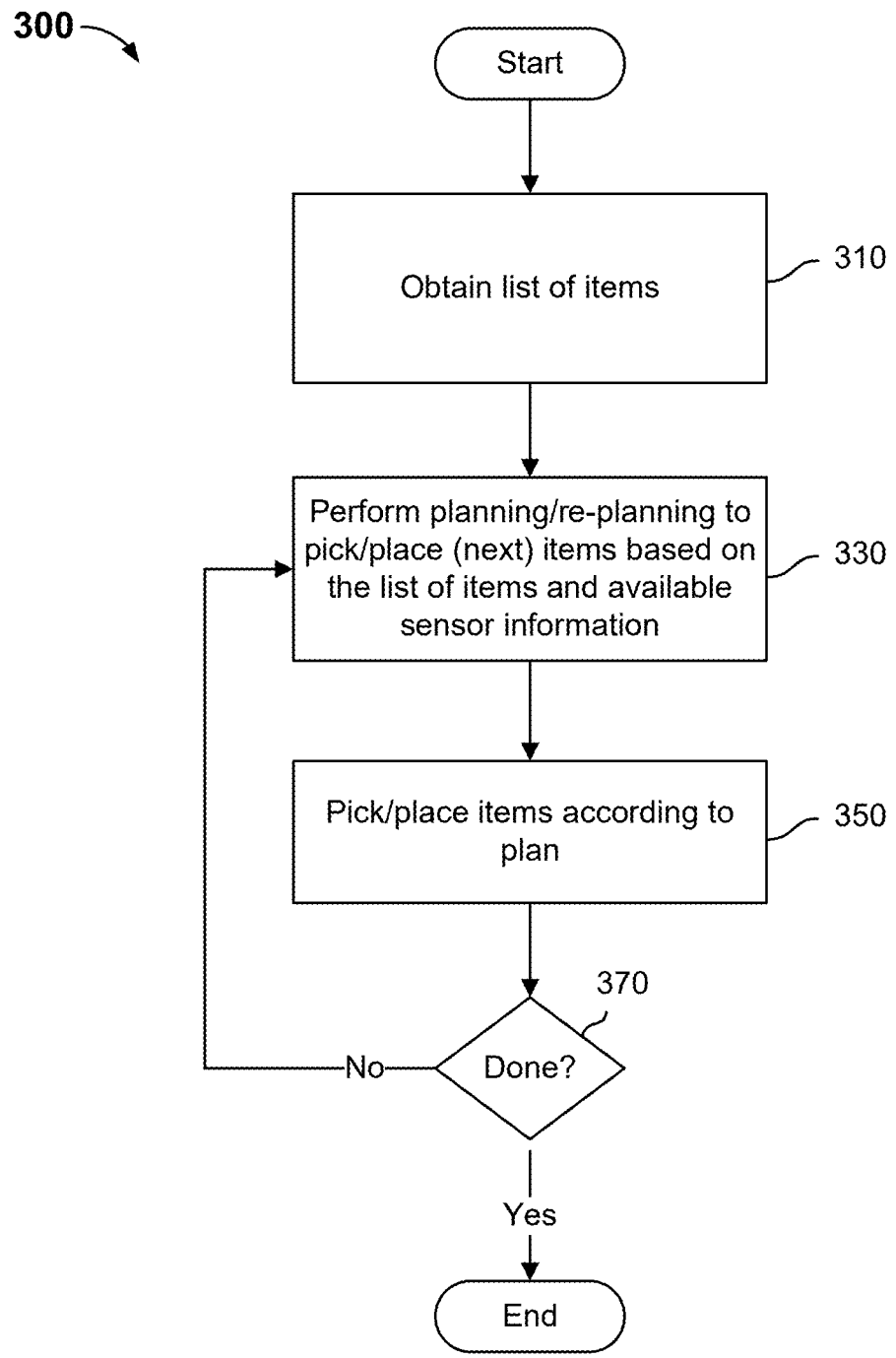
FIG. 3 is a flow chart illustrating an embodiment of a process to select and provide items for palletization.

FIG. 3 is a flow chart illustrating an embodiment of a process to select and provide items for palletization.

At 310, a list of items is obtained. The list of items may correspond to a set of items that are to be collectively palletized on one or more pallets. According to various embodiments, a set of items to be palletized is determined based at least in part on an indication that a manifest or order is to be fulfilled. For example, in response to receiving an order, a list of items for the order may be generated. As another example, a list of items corresponding to a plurality of orders to be sent to the same recipient may be generated.

The items may be located on a shelf or other location within a warehouse. In order to palletize the items, the items are moved to a robotic system that palletizes the items. For example, the items may be placed on one or more conveyors that move the items to within range of one or more robotic arms that palletize the items onto one or more pallets. In response to obtaining the list of items, at least of the items is associated with a particular robotic arm, a predefined zone corresponding to the particular robotic arm, and/or a particular pallet (e.g., a pallet identifier, a pallet located into a predefined zone), etc.

At 330, planning (or re-planning) is performed to generate a plan to pick/place items based on the list of items and available sensor information. The plan may include a one or more strategies for retrieving one or more items on the list of items and placing such items on the corresponding one or more conveyors to carry the items to a robotic arm. According to various embodiments, an order in which the items on the list of items are to be provided to the applicable robotic arm for palletizing is determined based at least in part on the list of items.

The order in which the items are placed on the conveyor may be at least loosely based on the items and an expected stack of the items on one or more pallets. For example, the system determining the order in which to place the items on the conveyor may generate a model of an expected stack(s) of the items, and determine the order based on the model (e.g., so as to first deliver items that form the base/bottom of the stack and progressively deliver items higher up the stack). In the case that the items on the list of items is to be palletized on a plurality of pallets, items that are expected to form the base/bottom of the respective stacks (or otherwise be relatively near the bottom of the stacks) may be placed on the conveyor before items that are expected to be substantially in the middle or top of the stacks. Various items that are to be palletized on the plurality of pallets may be interspersed among each other and the robotic system may sort the items upon arrival at the robotic arm (e.g., the robotic arm may pick and place the items onto an applicable pallet based at least on the item such as the identifier of the item or an attribute of the item). Accordingly, the items corresponding to the base/bottom portion of the corresponding stacks may be interspersed among each other and various items for each pallet/stack may be placed on the conveyor as the corresponding stack is built.

The computer system may generate a model of one or more expected stacks for the items belonging to the list of items. The model may be generated based at least in part on one or more thresholds such as a fit threshold value or stability threshold value, other packing metric (e.g., density), etc. For example, the computer system can generate a model of a stack for which an expected stability value satisfies (e.g., exceeds) the stability threshold value. The model may be generated using a machine learning process. The machine learning process may be iteratively updated based on historical information such as previous stacks of items (e.g., attributes of items in previous stacks, performance metrics pertaining to the previous stacks such as stability, density, fit, etc.). In some embodiments, the model of the stack(s) for palletizing the items on the list of items is generated based at least in part on one or more attributes of the items.

Various attributes of an item may be obtained before or during the determining of the plan. Attributes may include a size of an item, a shape of an item, a type of packaging of an item, an identifier of an item, a center of gravity of an item, an indication of whether the item is fragile, an indication of a top or bottom of the item, etc. As an example, one or more attributes pertaining to at least a subset of the items may be obtained based at least in part on the list of items. The one or more attributes may be obtained based at least in part on information obtained by one or more sensors, and/or by performing a lookup in a mapping of attributes to items (e.g., item types, item identifiers such as serial numbers, model numbers, etc.).

At 350, items are picked and moved through a (predetermined/planned) trajectory to a location near where the item is to be placed on the corresponding conveyor, and placed at the destination location according to the plan determined and/or updated at 330.

In the example shown, (re-)planning and plan implementation (330, 350) continue until the high level objective of providing the items on the list of items is completed (370), at which the process 300 ends. In various embodiments, re-planning (330) may be triggered by conditions such as arrival of an items that is not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 4:
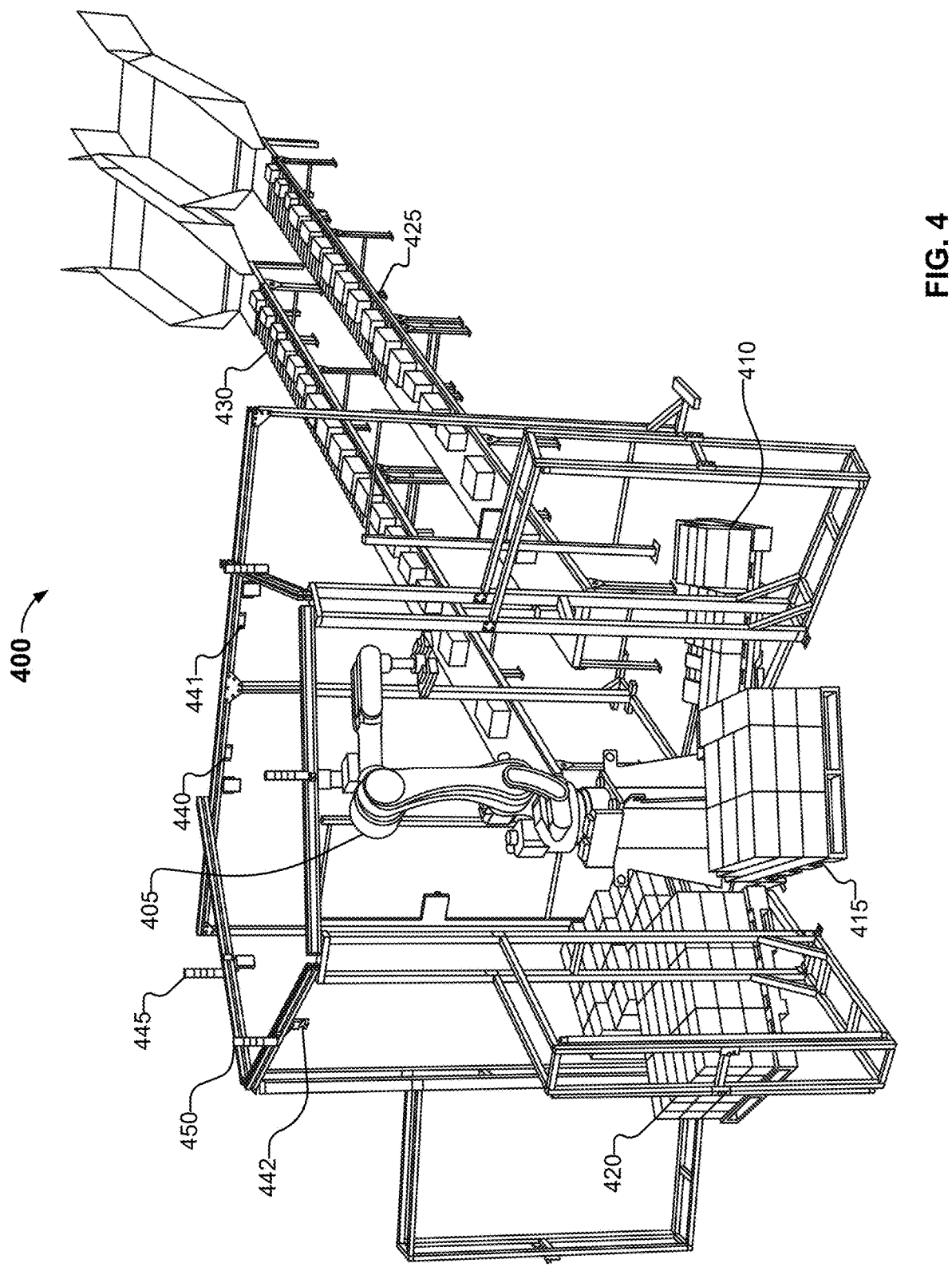
FIG. 4 is a diagram illustrating an embodiment of a robotic system to palletize and/or depalletize heterogeneous items.

FIG. 4 is a diagram illustrating an embodiment of a robotic system to palletize and/or depalletize heterogeneous items.

In the example shown, system 400 includes a robotic arm 405. In this example the robotic arm 405 is stationary, but in various alternative embodiments robotic arm 405 may be a fully or partly mobile, e.g., mounted on a rail, fully mobile on a motorized chassis, etc. In other implementations system 400 may include a plurality of robotic arms with a workspace. As shown, robotic arm 405 is used to pick arbitrary and/or dissimilar items from one or more conveyor belts (or other source) 425 and 430, and the items on a pallet (e.g., platform or other receptacle) such as pallet 410, pallet 415, and/or pallet 420. In some embodiments, other robots not shown in FIG. 1 of FIG. 4 may be used to push pallet 410, pallet 415, and/or pallet 420 into position to be loaded/unloaded and/or into a truck or other destination to be transported, etc.

As illustrated in FIG. 4, system 400 may comprise one or more predefined zones. For example, pallet 410, pallet 415, and pallet 420 are shown as located within the predefined zones. The predefined zones may be denoted by marking or labelling on the ground or otherwise structurally such as via the frame shown in system 400. In some embodiments, the predefined zones may be located radially around robotic arm 405. In some cases, a single pallet is inserted into a predefined zone. In other case, one or pallets are inserted into a predefined zone. Each of the predefined zones may be located within range of robotic arm 405 (e.g., such that robotic arm 405 can place items on a corresponding pallet, or de-palletize items from the corresponding pallet, etc.). In some embodiments, one of the predefined zones or pallets located within a predefined zone is used as a buffer or staging area in which items are temporarily stored (e.g., such as temporary storage until the item is to be placed on a pallet in a predefined zone).

One or more items may be provided (e.g., carried) to the workspace of robotic arm 405 such as via conveyor 425 and/or conveyor 430. System 400 may control a speed of conveyor 425 and/or conveyor 430. For example, system 400 may control the speed of conveyor 425 independently of the speed of conveyor 430, or system 400 may control the speeds of conveyor 425 and/or conveyor 430. In some embodiments, system 400 may pause conveyor 425 and/or conveyor 430 (e.g., to allow sufficient time for robotic arm 405 to pick and place the items. In some embodiments, conveyor 425 and/or conveyor 430 carry items for one or more manifests (e.g., orders). For example, conveyor 425 and conveyor 430 may carry items for a same manifest and/or different manifests. Similarly, one or more of the pallets/predefined zones may be associated with a particular manifest. For example, pallet 410 and pallet 415 may be associated with a same manifest. As another example, pallet 410 and pallet 420 may be associated with different manifests.

System 400 may control robotic arm 405 to pick an item from a conveyor such as conveyor 425 or conveyor 430, and place the item on a pallet such as pallet 410, pallet 415, or pallet 420. Robotic arm 405 may pick the item and move the item to a corresponding destination location (e.g., a location on a pallet or stack on a pallet) based at least in part on a plan associated with the item. In some embodiments, system 400 determines the plan associated with the item such as while the item is on the conveyor, and system 400 may update the plan upon picking up the item (e.g., based on an obtained attribute of the item such as weight, or in response to information obtained by a sensor in the workspace such as an indication of an expected collision with another item or human, etc.). System 400 may obtain an identifier associated with the item such as a barcode, QR code, or other identifier or information on the item. For example, system 400 may scan/obtain the identifier as the item is carried on the conveyor. In response to obtaining the identifier, system 400 may use the identifier in connection with determining the pallet on which the item is to be placed such as by performing a look up against a mapping of item identifier to manifests, and/or a mapping of manifests to pallets. In response to determining one or more pallets corresponding to the manifest/order to which the item belongs, system 400 may select a pallet on which to place the item based at least in part on a model or simulation of the stack of items on the pallet and/or on a placing of the item on the pallet. System 400 may also determine a specific location at which the item is to be placed on the selected pallet (e.g., the destination location). In addition, a plan for moving the item to the destination location may be determined, including a planned path or trajectory along which the item may be moved. In some embodiments, the plan is updated as the robotic arm 405 is moving the item such as in connection with performing an active measure to change or adapt to a detected state or condition associated with the one or more items/objects in the workspace (e.g., to avoid an expected collision event, to account for a measured weight of the item being greater than an expected weight, to reduce shear forces on the item as the item moved, etc.).

According to various embodiments, system 400 comprises one or more sensors and/or sensor arrays. For example, system 400 may include one or more sensors within proximity of conveyor 425 and/or conveyor 430 such as sensor 440 and/or sensor 441. The one or more sensors may obtain information associated with an item on the conveyor such as an identifier or information on label on the item, or an attribute of the item such as a dimensions of the item. In some embodiments, system 400 includes one or more sensors and/or sensor arrays that obtain information pertaining to a predefined zone and/or a pallet in the zone. For example, system 400 may include a sensor 442 that obtains information associated with pallet 420 or the predefined zone within which pallet 420 is located. Sensors may include one or more 2D cameras, 3D (e.g., RGBD) cameras, infrared, and other sensors to generate a three-dimensional view of a workspace (or part of a workspace such as a pallet and stack of items on the pallet). The information pertaining to a pallet may be used in connection with determining a state of the pallet and/or a stack of items on the pallet. As an example, system 400 may generate a model of a stack of items on a pallet based at least in part on the information pertaining to the pallet. System 400 may in turn use the model in connection with determining a plan for placing an item a pallet. As another example, system 400 may determine that a stack of items is complete based at least in part on the information pertaining to the pallet.

According to various embodiments, system 400 determines a plan for picking and placing an item (or updates the plan) based at least in part on a determination of a stability of a stack on a pallet. System 400 may determine a model of the stack for one or more of pallets 410, 415, and/or 420, and system 400 may use the model in connection with determining the stack on which to place an item. As an example, if a next item to be moved is relatively large (e.g., such that a surface area of the item is large relative to a footprint of the pallet), then system 400 may determine that placing the item on pallet 410 may cause the stack thereon to become unstable (e.g., because the surface of the stack is non-planar). In contrast, system 400 may determine that placing the relatively large (e.g., planar) item on the stack for pallet 415 and/or pallet 420 may result in a relatively stable stack. The top surfaces of the stacks for pallet 415 and/or pallet 420 are relatively planar and the placement of a relatively large item thereon may not result in the instability of the stack. System 400 may determine that an expected stability of placing the item on pallet 415 and/or pallet 420 may be greater than a predetermined stability threshold, or that placement of the item on pallet 415 or pallet 420 may result in an optimized placement of the item (e.g., at least with respect to stability).

System 400 may communicate a state of a pallet and/or operation of the robotic arm 405 within a predefined zone. The state of the pallet and/or operation of the robotic arm may be communicated to a user or other human operator. For example, system 400 may include a communication interface (not shown) via which information pertaining to the state of system 400 (e.g., a state of a pallet, a predetermined zone, a robotic arm, etc.) to a terminal such as on demand teleoperation device 122 and/or a terminal used by a human operator. As another example, system 400 may include a status indicator within proximity of a predefined zone, such as status indicator 445 and/or status indicator 450.

Status indicator 450 may be used in connection with communicating a state of a pallet and/or operation of the robotic arm 405 within the corresponding predefined zone. For example, if system 400 is active with respect to the predefined zone in which pallet 420 is located, the status indicator can so indicate such as via turning on a green-colored light or otherwise communicating information or an indication of the active status via status indicator 450. System 400 may be determined to be in an active with respect to a predefined zone in response to determining that robotic arm 405 is actively palletizing one or more items on the pallet within the predefined zone. As another example, if system 400 is inactive with respect to the predefined zone in which pallet 420 is located, the status indicator can so indicate such as via turning on a red-colored light or otherwise communicating information or an indication of the active status via status indicator 450. System 400 may be determined to be inactive in response to a determination that robotic arm 405 is not actively palletizing one or more items on the pallet within the predefined zone, for example in response to a user pausing that predefined zone (or cell), or in response to a determination that a palletization of items on pallet 420 is complete. A human operator or user may use the status indicator as an indication as to whether entering the corresponding predefined zone is safe. For example, a user working to remove completed pallets, or inserting empty pallets, to/from the corresponding predefined zone may refer to the corresponding status indicator and ensure to enter the predefined zone when the status indicator indicates that operation within the predefined zone is inactive.

According to various embodiments, system 400 may use information obtained by one or more sensors within the workspace to determine an abnormal state pertaining to the pallet and/or items stacked on the pallet. For example, system 400 may determine that a pallet is misaligned relative to robotic arm 405 and/or the corresponding predefined zone based at least in part on the information obtained by the sensor(s). As another example, system 400 may determine that a stack is unstable, that items on a pallet are experiencing a turbulent flow, etc. based at least in part on the information obtained by the sensor(s). In response to detecting the abnormal state, system may communicate an indication of the abnormal state such as an on-demand teleoperation device or other terminal used by an operator. In some embodiments, in response to detecting the abnormal state, system 400 may automatically set the pallet and/or corresponding zone to an inactive state. In addition to, or as an alternative to, notifying an operator of the abnormal state, system 400 may perform an active measure. The active measure may include controlling the robotic arm 405 to at least partially correct the abnormal state (e.g., restack fallen items, realign the pallet, etc.). In some implementations, in response to detecting that an inserted pallet is misaligned (e.g., incorrectly inserted to the predefined zone), system 400 may calibrate the process for modelling a stack and/or for placing items on the pallet to correct for the misalignment. For example, system 400 may generate and use an offset corresponding to the misalignment when determining and implementing a plan for placing an item on the pallet. In some embodiments, system 400 performs the active measure to partially correct the abnormal state in response to determining that an extent of the abnormality is less than a threshold value. Examples of determining that an extent of the abnormality is less than a threshold value include (i) a determination that the misalignment of the pallet is less than a threshold misalignment value, (ii) a determination that a number of dislodged, misplaced, or fallen items is less than a threshold number, (iii) a determination that a size of a dislodged, misplaced, or fallen item satisfies a size threshold, etc.

A human operator may communicate with system 400 via a network such as a wired network and/or a wireless network. For example, system 400 may comprise a communication interface via which system 400 is connected to one or more networks. In some embodiments, a terminal connected via network to system 400 provides a user interface via which human operator can provide instructions to system 400, and/or via which the human operator may obtain information pertaining to a state of system 400 (e.g., a state of robotic arm, a state of a particular pallet, a state of a palletization process for a particular manifest, etc.). The human operator may provide an instruction to system 400 via an input to the user interface. For example, a human operator may use the user interface to pause the robotic arm, pause a palletization process with respect to a particular manifest, pause a palletization process for a particular pallet, toggle a status of a pallet/predefined zone between active/inactive, etc.

In various embodiments, elements of system 400 may be added, removed, swapped out, etc. In such an instance, a control computer initializes and registers the new element, performs operational tests, and begins/resumes kitting operations, incorporating the newly added element, for example.

Figure 5A:
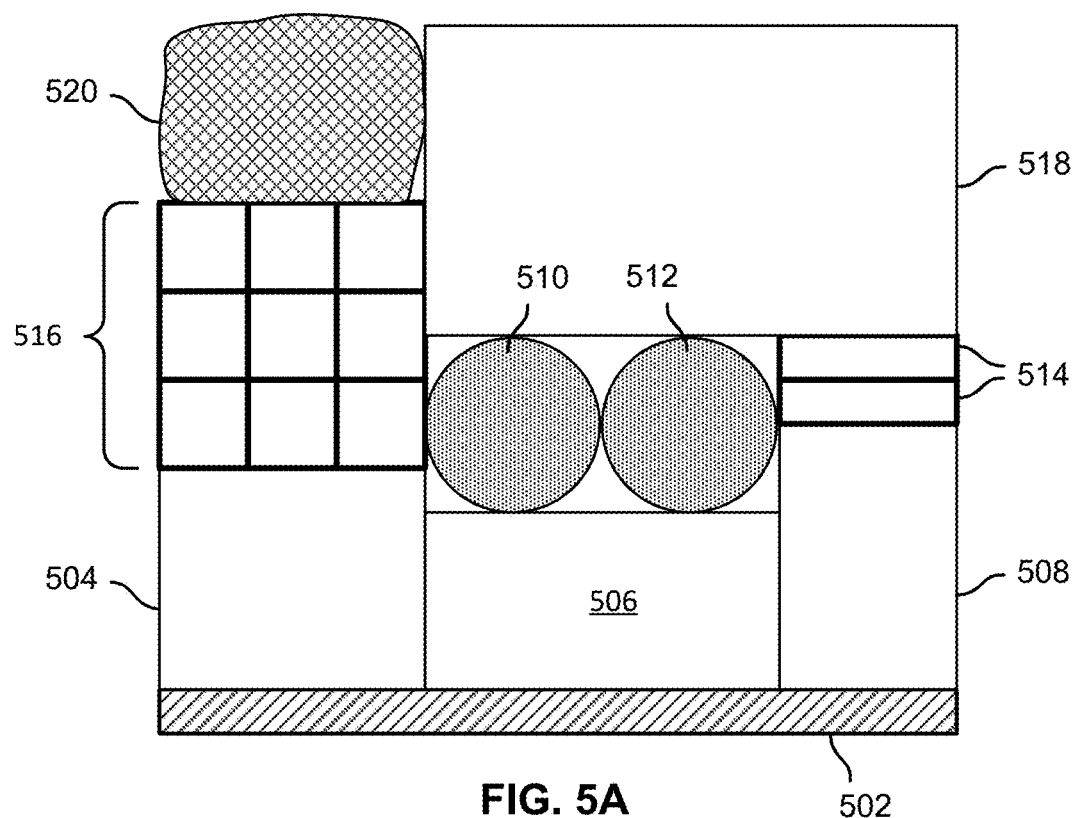
FIG. 5A is a diagram illustrating an example of a pallet as assembled in an embodiment of a robotic system to palletize and/or depalletize heterogeneous items.

FIG. 5A is a diagram illustrating an example of a pallet as assembled in an embodiment of a robotic system to palletize and/or depalletize heterogeneous items. In various embodiments, the items shown in FIG. 5A as stacked on pallet 502 may have been stacked by a robotic system, such as system 100 of FIG. 1 and/or system 400 of FIG. 4, according to a computer-determined (and/or updated) plan, as in the process 200 of FIG. 2.

In the example shown, items 504, 506, and 508 are stacked in a first (bottom-most) layer, with items 510, 512, 514, and 516 stacked in a layer on top of items 504, 506, and 508. Items 518 and 520 have been stacked on top.

In various embodiments, the items as shown may have been selected and designated to be placed as shown in FIG. 5A based on item identification and/or attributes, e.g., as determined and/or measured based on image, weight, and/or other sensor data. For example, items 504, 506, and 508 may have been placed in the bottom layer, as shown, based on their (relative) size, weight, rigidity, strength, and/or other indication of ability (of item and/or packaging) to support weight stacked on top.

The placement, orientation, etc., of each item is determined in various embodiments by applying one or more heuristics, algorithms, or other tools and/or techniques. For example, each item is added at least in part by determining a location within the entire pallet and/or in a layer currently being stacked and/or arranged so as to provide a relatively (more) flat top surface to form the basis for a next layer, to minimize stack surface area, to minimize current layer perimeter, etc. In various embodiments, one or more of the following heuristics may be used: place next item to maintain center of mass close to the center of the pallet; maintain a clear motion path for the robotic arm for subsequent items; maintain visibility of the cameras to all top layer boxes or unboxed items; etc. In some embodiments, one or more of the aforementioned heuristics may be used in connection with determining a value pertaining to stability of a stack of items, etc.

In the example shown, items 510 and 512 are round (at least in cross-section), and in some embodiments their shape would be taken into consideration in selecting a location to place them. For example, an interior location in which items 510 and 512 are constrained by other adjacent items, as shown in FIG. 5A, may be selected over a location on the edge or end of a layer.

Items 518 and 520 may have been selected to be placed on top, in various embodiments, based on one or more attributes, such as their weight (or density), ability to support weight stacked on top of them, etc.

Figure 5B:
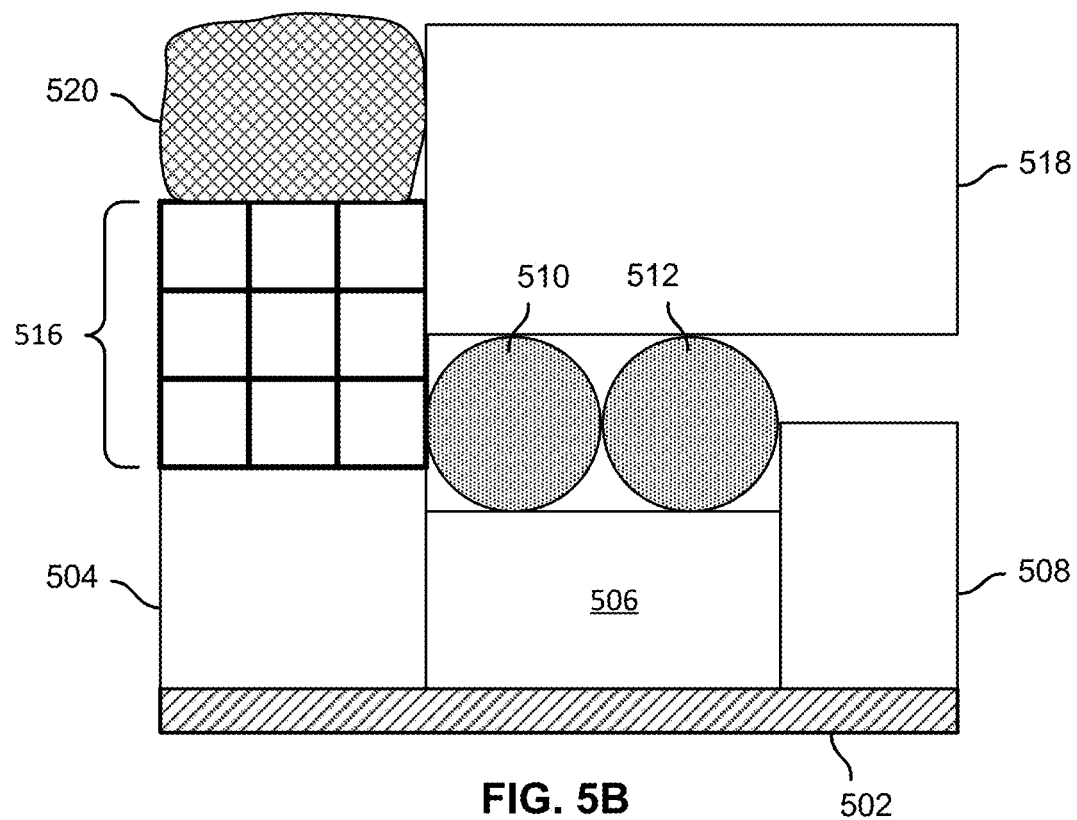
FIG. 5B is a diagram illustrating an example of a pallet as assembled in an embodiment of a robotic system to palletize and/or depalletize heterogeneous items.

FIG. 5B is a diagram illustrating an example of a pallet as assembled in an embodiment of a robotic system to palletize and/or depalletize heterogeneous items. In this example, the items 514 included in the example as shown in FIG. 5A are omitted. In various embodiments, a plan to stack items as shown in FIG. 5B may be generated by a control computer, such as control computer 118 of FIG. 1 or a control computer comprised in system 400 of FIG. 4. In the example shown, an algorithmically generated plan may consider the item 518 stacked on items 510, 512 to be in a stable position. For example, there may be no computed net moment about any point or axis that would lead a control computer to determine the position as shown is not stable. In practice, however, slight deviation from plan in the placement of items on pallet 502 could result in the item 518 not being in a stable position once stacked on items 510, 512, for example. In some embodiments, a robotic arm and end effector (e.g., suction, gripper) used to place item 518 includes sensors and logic to detect instability. For example, image data may be processed and may indicate the items is leaning to the right, as shown. Or, prior to releasing the item 518 force sensors in the end effector may be used to detect the item would not be stable if released. For example, if the item gives way (or provides resistance unevenly) when pressed down but not yet released, in various embodiments the system determines the item is not stable. In some embodiments, the robotic system dynamically updates the model of the stack such as in response to obtaining information pertaining to stability/instability of the stack or item placed on the stack, or in response to placing the item, etc.

In various embodiments, detection of unexpected instability triggers responsive action. For example, other items (e.g., items 514 as in FIG. 5A) may be placed in position to further support the item that was not stable. Or, the item may be shifted to a different nearby position (e.g., snugged left in the example shown), to see if the item would be stable in the new position. Or, the item may be removed from the stack and moved to a buffer or staging area in which the item is temporarily stored until the robotic system determines a more ideal destination location (e.g., as additional items are stacked on the pallet and a space in which the item would better fit or result in better stability is formed). In various embodiments, if automated processing fails to determine a resolution, human intervention (e.g., via teleoperation, manually, etc.) may be triggered.

Figure 6A:
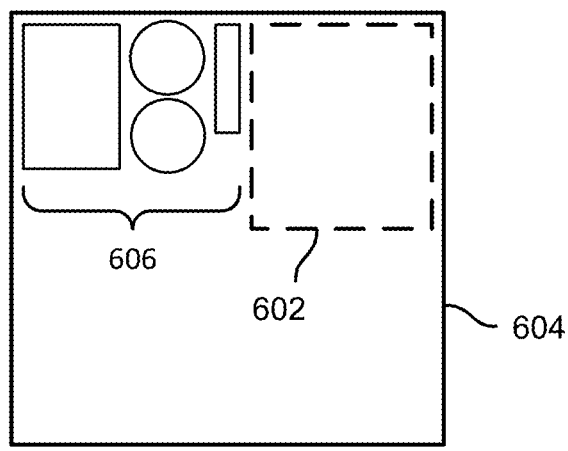
FIG. 6A is a diagram illustrating an example of item placement on a pallet in an embodiment of a robotic system to palletize and/or depalletize heterogeneous items.

FIG. 6A is a diagram illustrating an example of item placement on a pallet in an embodiment of a robotic system to palletize and/or depalletize heterogeneous items. In the example shown, a location 602 has been determined to place an item (not shown in FIG. 5A) on a pallet 604 in a position adjacent to previously-placed items 606. For example, the location 602 may have been determined based on item attributes (size, weight, dimensions, etc.), as in 230 of FIG. 2.

Figure 6B:
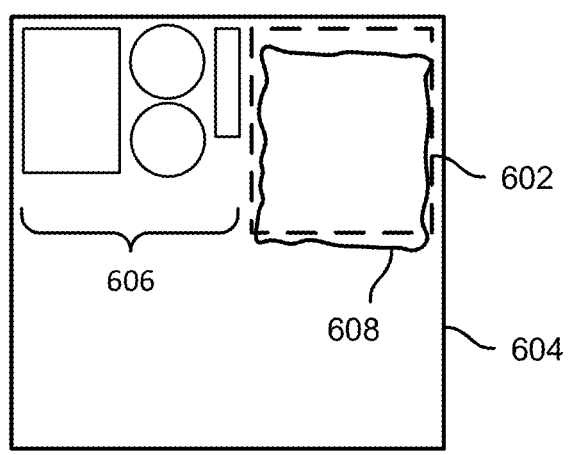
FIG. 6B is a diagram illustrating an example of item placement on a pallet in an embodiment of a robotic system to palletize and/or depalletize heterogeneous items.

FIG. 6B is a diagram illustrating an example of item placement on a pallet in an embodiment of a robotic system to palletize and/or depalletize heterogeneous items. In the example shown, the item 608 has been moved to a first order of accuracy to a position at or near the intended location 602. In this example, the item 608 has a slightly irregular outer texture, which may have resulted in imperfect picking and/or placement of the item at or near location 602. In some embodiments, variations and/or inconsistencies in the image data and/or other sensor data received concerning one or more of location 602, pallet 604, items 606, and item 608 may have resulted in the imperfect placement of item 608 as shown in FIG. 6B.

Figure 6C:
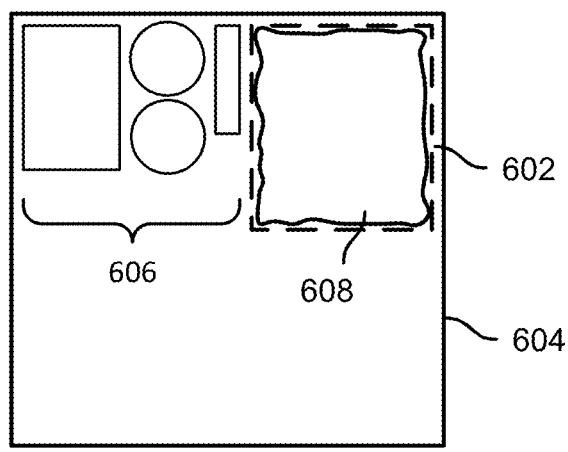
FIG. 6C is a diagram illustrating an example of item placement on a pallet in an embodiment of a robotic system to palletize and/or depalletize heterogeneous items.

FIG. 6C is a diagram illustrating an example of item placement on a pallet in an embodiment of a robotic system to palletize and/or depalletize heterogeneous items. In the example shown, the item 608 has been snugged into a location at or near planned location 602 to a second order of accuracy. In various embodiments, second order sensors, such as force sensors embodied in/on a robotic arm and/or end effector, are used to snug an item into a more tightly-fitted position in a stack. For example, the robotic arm may be used to snug an item, such as item 608, to a position more close and in (more complete) contact with adjacent items (e.g., items 606) and/or other structures, such as side walls (in the case of a pallet or trolley that has one or more side walls, for example). According to various embodiments, a machine learning process is implemented to update the strategies and/or plans for performing active measures such as applying pressure to snug the item into position. The machine learning process may be updated/improved dynamically in response to the strategy and/or plan being implemented by one or more robotic systems.

In some embodiments, an item such as item 608 may be snugged more closely to adjacent items, sidewalls, etc. and may result in the item ending up in a location not entirely consistent with the original plan. In some embodiments, snug placement is desired and preferred within layers to maximize the use of available space and to maximize stability by couple adjacent items to one another and (as applicable) to adjacent structures, such as sidewalls.

Figure 7A:
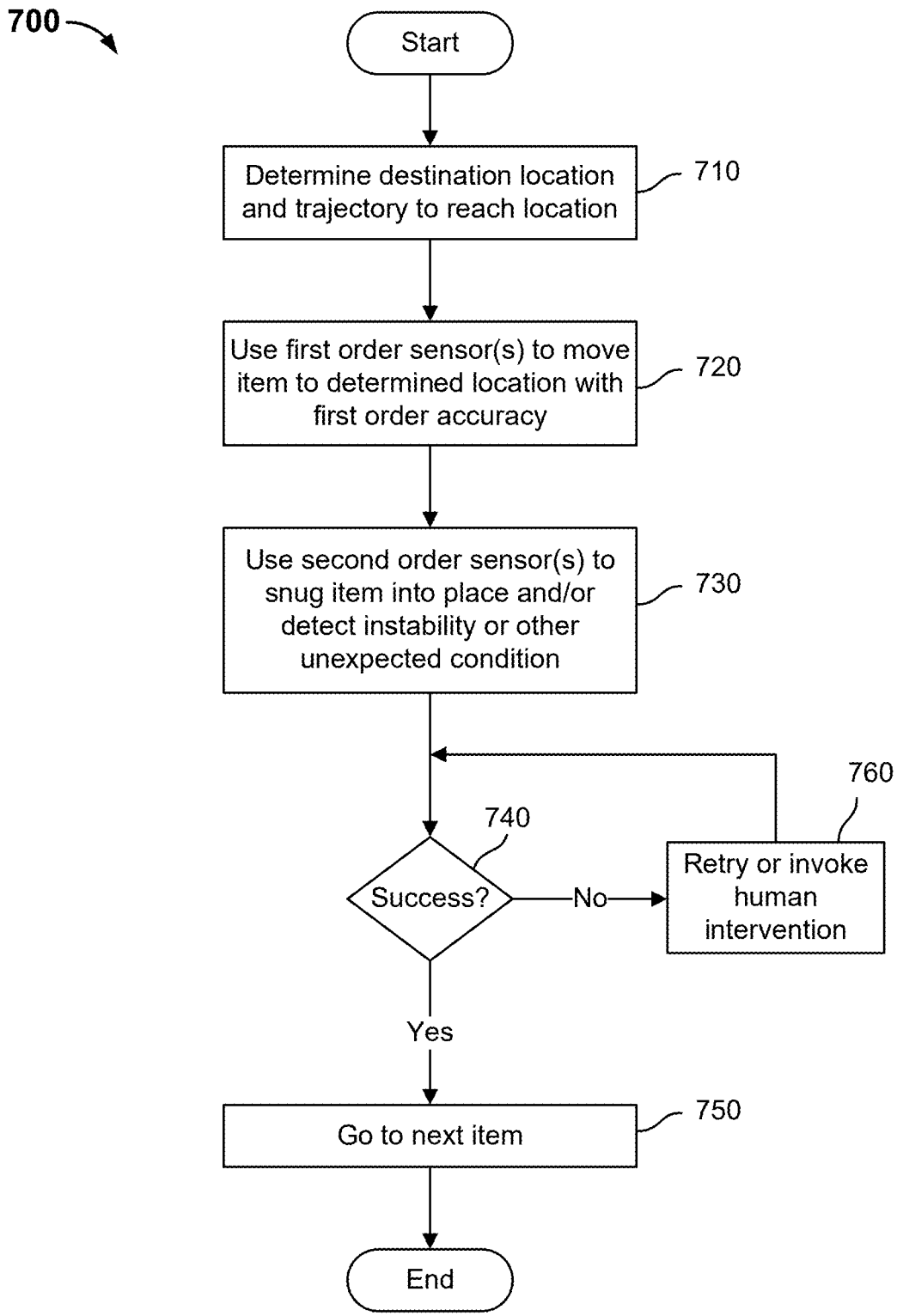
FIG. 7A is a flow chart illustrating an embodiment of a process to place an item on a pallet.

FIG. 7A is a flow chart illustrating an embodiment of a process to place an item on a pallet. In various embodiments, the process 700 is performed by a control computer, such as control computer 118 of FIG. 1 and/or a control computer of system 400 of FIG. 4, e.g., to pick and place successive items according to a plan.

In the example shown, at 710 a destination location and trajectory to reach the location are determined for a next item to be picked and placed. For example, a predetermined (e.g., according to a plan) and/or a dynamically-determined (e.g., based on item identification, sensor data, locations of previously-placed items, etc.) location and a trajectory or path along which the item is to be moved to that location may be determined. At 720, one or more first order sensors (e.g., image data) are used to move the item to the destination location with first order accuracy (e.g., as in the example shown in FIG. 6B). At 730, one or more second order sensors (e.g., force sensors) are used to snug the item into place (as in FIG. 6C) and/or to detect instability (as in FIG. 5B) or other unexpected conditions. If the item is determined at 740 to have been placed successfully, at 710 processing continues with a next item, with respect to which a next iteration of the process 700 is performed. If the item is determined at 740 not to have been placed successfully (e.g., item not in expected location as determined by image data, item not stable, stack not stable, etc.), then at 760 the system tries again via automated processing to securely place the item, e.g., if a further strategy to attempt to do so is available, and/or human intervention is invoked (e.g., via on demand teleoperation) until the item is determined at 740 to have been placed successfully.

In various embodiments, a robotic system to palletize/depalletize as disclosed herein is configured to make and/or update dynamically a plan to place and stack items. For example, the next item(s) to be placed may not be known ahead of time, and adjustments to the plan may be required. For example, if soft and/or fragile items have been placed or planned to be placed in a lower layer and heavier items are detected to be arriving (next), the plan may be adjusted dynamically to buffer (set aside in a staging area) the soft and/or fragile items, allowing the heavier items to be placed in the lower level first. In some embodiments, if the soft and/or fragile items have already been placed (e.g. on the pallet), the items may be removed to the buffer (staging) area to allow the heavier items to be placed in the lower level in their place.

According to various embodiments, a machine learning process may be used in connection with updating the process or model for determining the destination location and trajectory and/or strategies for placing the item at the destination location. For example, the model for determining the destination location and trajectory and/or strategies for placing the item at the destination location to better reflect strategies that were successful and/or strategies that were not successful, including an association of the strategies and/or historical information with the item subject to such strategy or one or more attributes of such an item.

Figure 7B:
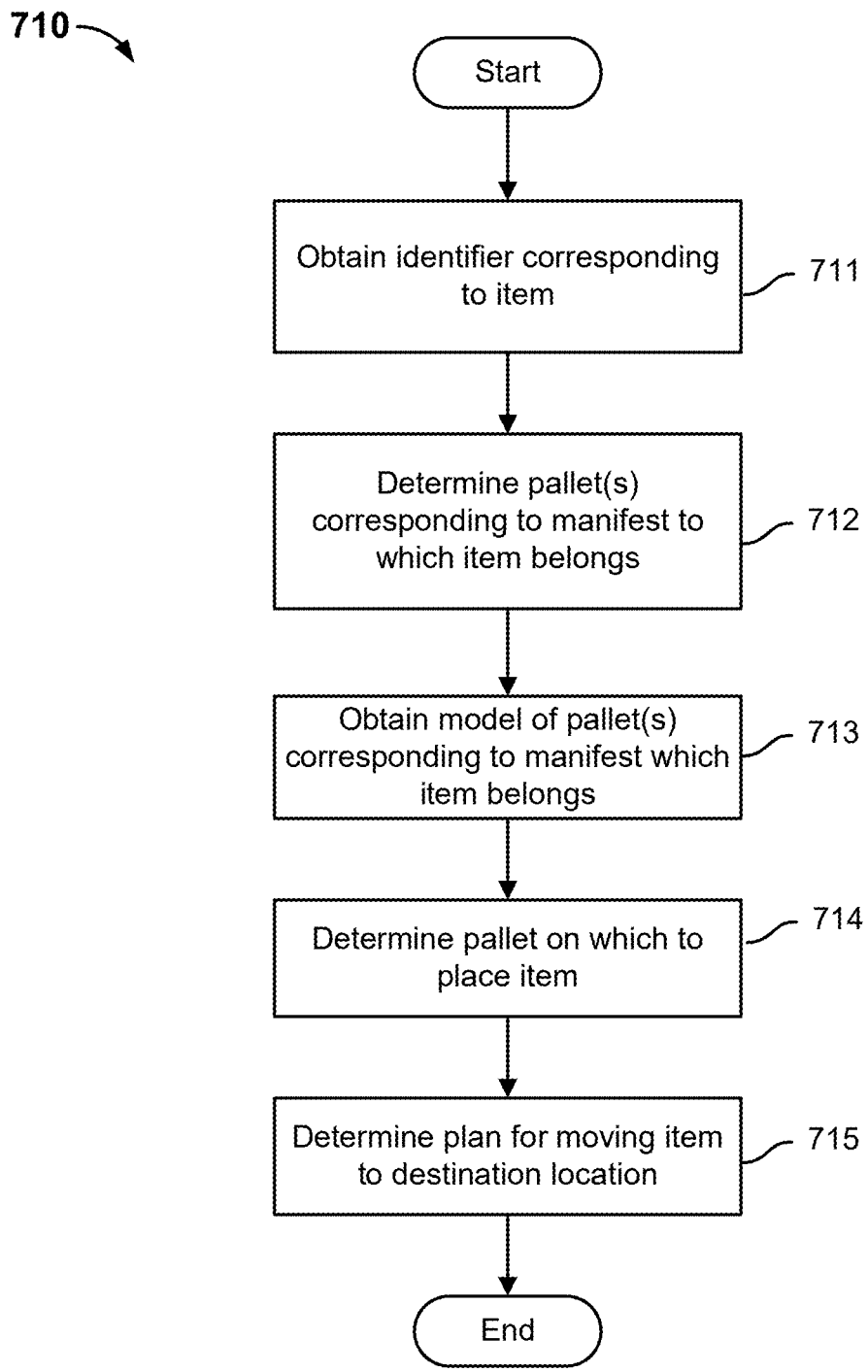
FIG. 7B is a flow chart illustrating an embodiment of a process to place an item on a pallet.

FIG. 7B is a flow chart illustrating an embodiment of a process to place an item on a pallet. In some embodiments, process 710 of FIG. 7B corresponds to, or is implemented in connection with, 710 of process 700 of FIG. 7A. Process 710 is performed by a control computer, such as control computer 118 of FIG. 1 and/or a control computer of system 400 of FIG. 4, e.g., to determine a plan for picking/placing an item.

At 711, an identifier corresponding to an item is obtained. In some embodiments, the system obtains the identifier based at least in part on information obtained by one or more sensors. For example, the identifier may be a barcode, a QR code, a near field communication label, etc., one or more sensors in the workspace such as a sensor (e.g., scanner) at an input to the system may obtain the information pertaining to the identifier. The sensor at the input to the system may be a sensor located within proximity of a conveyor that carries the items to the system. In some embodiments, the identifier corresponding to the item is obtained from a data structure such as a mapping of trays or conveyor slot to items and/or item identifiers. The data structure may have been set by an upstream system that retrieved the items and provided the items for palletization.

At 712, one or more pallets corresponding to a manifest to which the item belongs is determined. In some embodiments, the system may use the identifier corresponding to the item in connection with determining the manifest to which the item belongs. For example, the system may perform a lookup with respect to a mapping of item identifiers to manifests, etc. In response to determining the manifest to which the item belongs, the system may determine the one or more pallets corresponding to the manifest. As an example, if a manifest of items comprises a sufficiently large number of items so that all items on the manifest do not fit on a single pallet, the system may determine a plurality of pallets on which the item may be placed (and still satisfy fulfillment of the manifest with respect to the item). As another example, if the system simultaneously stacks items on a plurality of pallets, the system may determine which one or more pallets of the plurality of pallets correspond to the manifest.

At 713, a model of at least one of the one or more pallets corresponding to the manifest to which the item belongs are determined. According to various embodiments, the system obtains a model for each of the pallets corresponding to the manifest. The system may obtain the model for pallets that correspond to the manifest and for which the system is actively palletizing items on the pallets (e.g., predefined zone in which the pallet is located is not paused or set to inactive).

In some embodiments, the system may obtain a cached model pertaining to a pallet (e.g., a model of the stack of items on the pallet). As an example, cached model may comprise a current model of the stack of items on the pallet. As another example, the cached model may comprises a model according to a previous state of the stack of items on the pallet. In response to a determination that the cached model corresponds to a previous state of the stack of items on the pallet, the system may generate a new model corresponding to a current state of the stack of items on the pallet, or update the cached model to correspond to the current state.

In some embodiments, the system generates the model for the at least one of the one or more pallets corresponding to the manifest to which the item belongs. The system may generate a model of a stack of items on a pallet based at least in part on the information obtained by one or more sensors in the workspace such as a sensor that obtains information pertaining to the predefined zone in which the pallet is located.

At 714, a pallet on which to place the item is determined. In some embodiments, the pallet on which to place the item is determined based at least in part on the corresponding model pertaining to the pallet. The pallet may be determined based at least in part on an updated model or simulation in connection with assessing an expected stack of items if the item were to be placed on the pallet. In the case of a plurality of pallets corresponding to the manifest to which the item belongs, the system may select a pallet on which to place the item based on a determination that the item fits best on the pallet (e.g., on the stack of items), etc.

According to various embodiments, the system may determine the pallet on which to place the item based at least in part on a state of the pallet and/or a state of the plurality of pallets. The system may determine a state of a stack on one or more of the plurality of pallets, and determine the pallet on which to place the item based at least in part on a determination of a stack for which the item has a best fit. The determination that the stack for which the item has a best fit may be based at least in part on a stability of the stack, a model of the stack and/or a model of the stack comprising the item (e.g., after the item is placed on the stack), an expected one or more items that remain to be stacked (e.g., based at least in part on an order and/or manifest), etc. One or more attributes or characteristics pertaining to the item may be used in connection with determining the pallet on which to place the item (e.g., a size, shape, type of packaging, type of item, etc. may be used in connection with modelling the stack and/or determining where to place the item on a stack).

The system may generate the model of the state of the pallet in connection with determining whether to place an item on the pallet (e.g., on the stack), and selecting a plan for placing the item on the pallet, including a destination location at which the item is to be placed, a trajectory along which the item is to be moved from a source location (e.g., a current destination such as a conveyor) to the destination location. The system may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. The system may select a destination location for which the expected fit and/or expected stability satisfies (e.g., exceeds) a corresponding threshold value. Additionally, or alternatively, system may select a destination location that optimizes the expected fit (e.g., of the item on the stack) and/or expected stability (e.g., of the stack).

At 715, a plan for moving the item to a destination location is determined. In some embodiments, in response to determining the pallet on which to place the item, the system determines a destination location on the pallet at which to place the item. The system may also determine a plan for moving the item such as picking the item from the input (e.g., the conveyor) and placing the item at the destination location (e.g., on the pallet). The system may determine the plan for moving the item based at least in part on one or more attributes of the item and/or the model of the pallet (e.g., a current state/properties of the pallet such as a state of the stack of items on the pallet).

Figure 8:
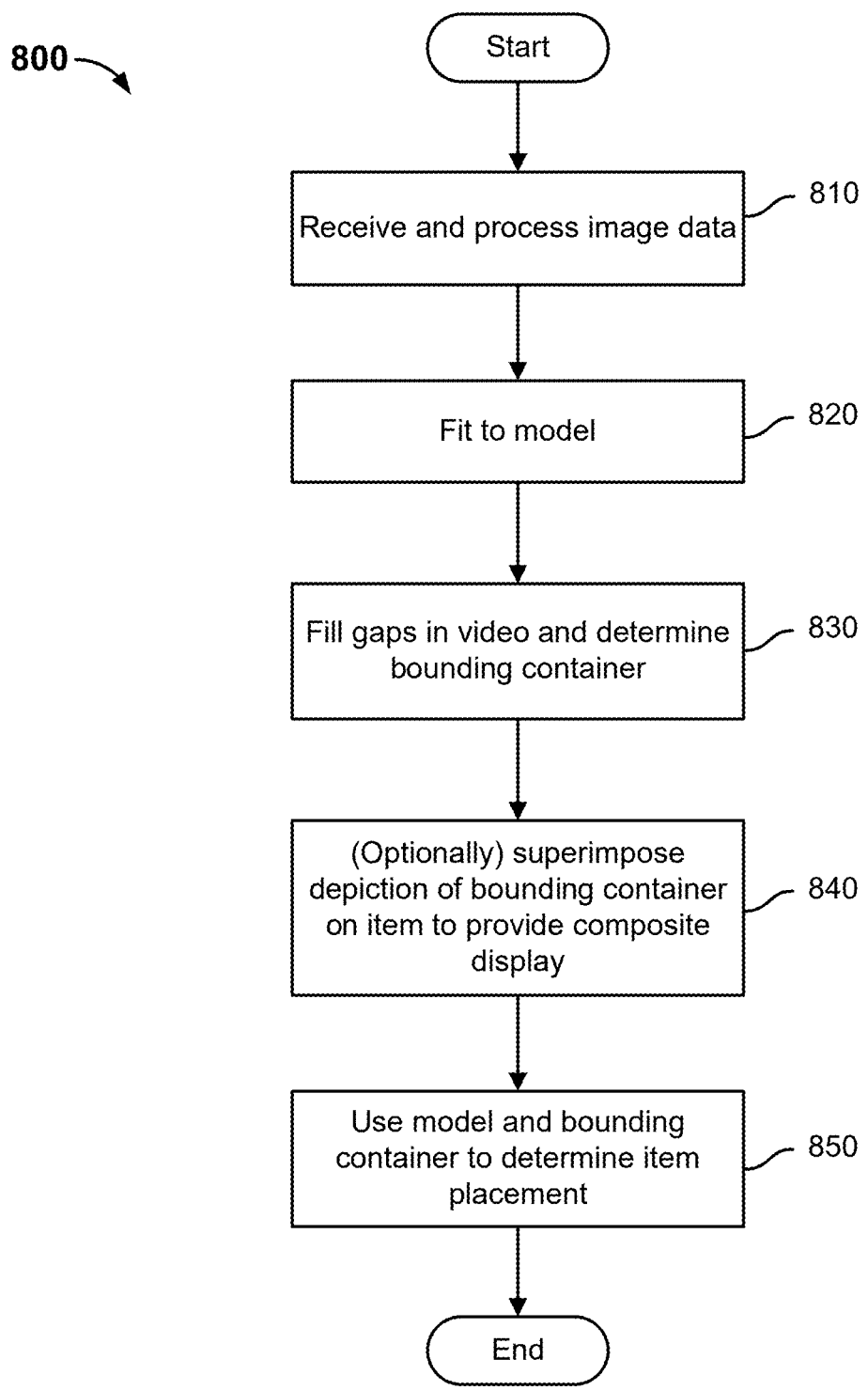
FIG. 8 is a flow chart illustrating an embodiment of a process to place items on a pallet.

FIG. 8 is a flow chart illustrating an embodiment of a process to place items on a pallet. In various embodiments, the process 800 is performed by a control computer, such as control computer 118 of FIG. 1 and/or control computer of system 400 of FIG. 4, based on sensor data, such as image data generated by sensors in the workspace such as cameras 112, 114, and 116. In various embodiments, the process 800 is used to determine item attributes and placement dynamically, e.g., based on item size and shape as determined based at least in part on image data.

In the example shown, at 810 image data is received and processed. For example, image data from two or more cameras may be received and merged to generate a composite set of points in three dimensional space.

At 820, image data received and processed at 810 is fitted to a model. For example, the composite set of points may be compared to corresponding data comprising a library of item models and a "best fit" or "best match" model may be determined. In some embodiments, the library of item models is dynamically updated based at least in part on a machine learning process that uses information from historical models and results of implementation of such models to improve or update.

At 830, gaps in the image data are filled, e.g., using data from the best fit model, and a bounding container (e.g., a bounding "box" for an item that is rectangular or nearly so in all dimensions) is determined for the item.

Optionally, at 840, a graphical depiction of the bounding container is superimposed on the composite and/or raw image of the item (e.g., raw video) to provide a composite display, e.g., to a human user monitoring the operation.

At 850, the model determined at 820 and the bounding container determined at 830 are used to determine a destination location at which to place the item (e.g., on a pallet). In some embodiments, the bounding container may be displayed in the determined placement location, e.g., in a visual display and/or representation of the operation to pick and place the item.

Figure 9:
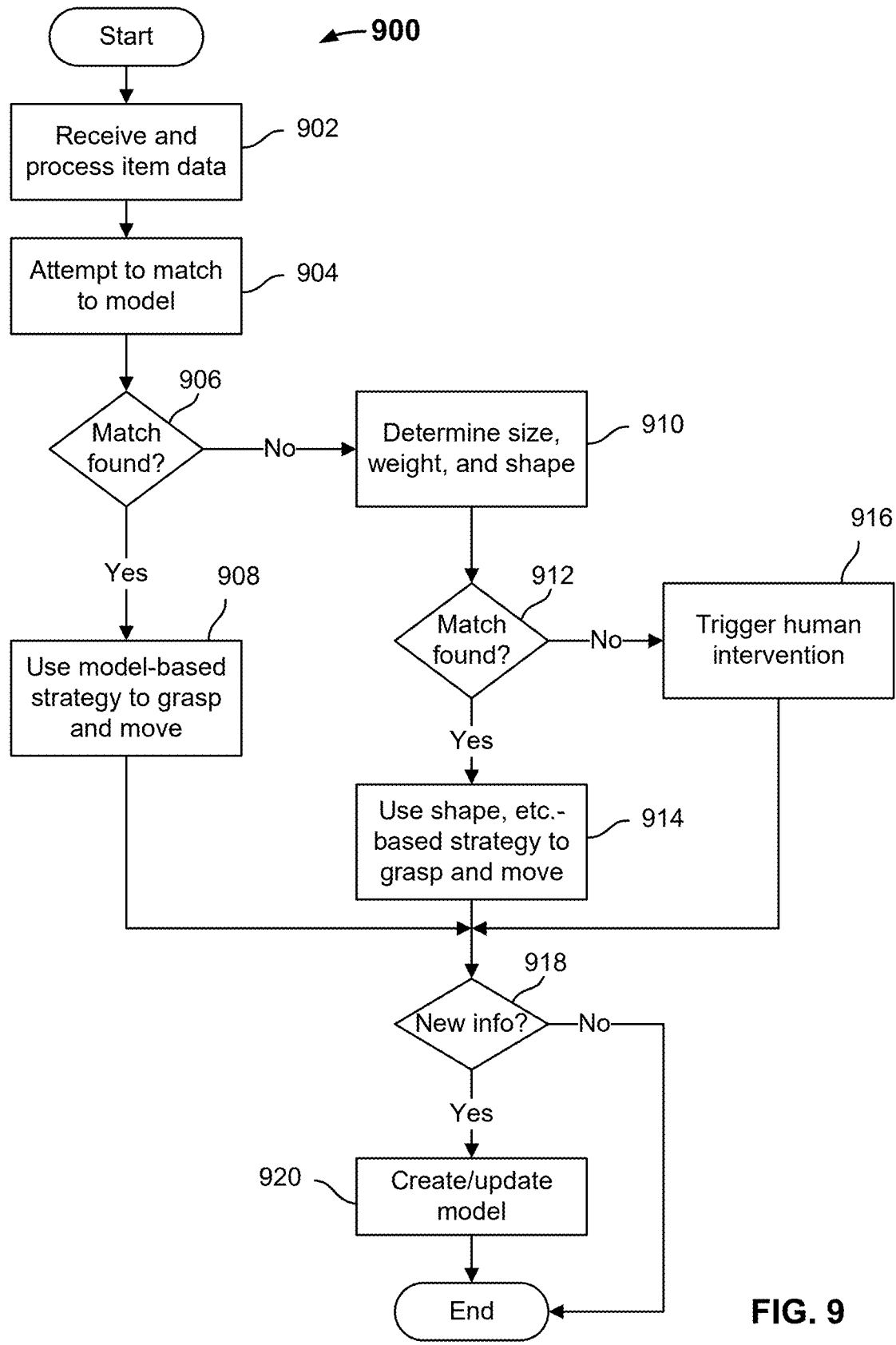
FIG. 9 is a flow chart illustrating an embodiment of a process to place an item on a pallet.

FIG. 9 is a flow chart illustrating an embodiment of a process to place an item on a pallet. In various embodiments, the process 900 is performed by a control computer, such as control computer 118 of FIG. 1 and/or control computer of system 400 of FIG. 4. In the example shown, at 902 item data is received and processed. Example of item data include without limitation image data, optical or other scanner output, item weight, item identifier, item size, etc.

At 904, an attempt is made to match the item data to a model, e.g., a model comprising a library of item models. The library of item models may be dynamically updated such as via a machine learning process. For example, markings on the item or its packaging may be read to identify the item and look up an item-specific model. In some embodiments, sensor readings may point in different directions. In some embodiments, outlier (e.g., an item that is not statistically relevant) and/or randomly selected sensor data may be removed from consideration to determine whether the remaining data can be match (e.g., with a prescribed degree of confidence) to an item model. If so, the sensor data from that sensor is discarded and a match is determined at 906 to have been found.

If a match to an item-specific model is determined at 906 to have been found, based on the data received at 902, a strategy based on that model is used at 908 to determine a strategy to grasp, pick up, move, and/or place the item.

If it is determined at 906 that a match to an item-specific model cannot be found, at 910 the size, weight, shape, type of packaging, center of gravity, and/or other attributes of the item are determined and attempted to be matched to a model associated with items of that size, weight, shape, etc. If at 912 it is determine that a match to such a model has been found, at 914 the determined model is used to determine a strategy to grasp, pick up, move, and/or place the item. Otherwise, at 916 human intervention is triggered, e.g., to manually input a strategy and/or an item identification to be mapped to a strategy, and/or to complete all or part of the operation with respect to the item by teleoperation, manually, etc.

At 918 it is determined whether processing the item has generated additional or new information about the item and/or item type. If so, at 920 the new information is used to generate and/or update a model for the item and/or item type. New information may include a measured weight, a center of gravity, a type of packaging, etc. If no new information has been developed and/or once such information has been reflected in any applicable model(s), the process ends.

In some embodiments, detection of a new item or item type triggers a discovery process in which attributes of the item may be determined and determined more fully or precisely. For example, the system may use the robotic arm to pick up the item and hold it in different locations and/or at different orientations to generate (additional) images or views of the item to be used to model or more completely model the item.

In various embodiments, a robotic system to palletize and/or depalletize heterogeneous items as disclosed herein includes a robotic arm with a suction-based, gripper-type, or other end effector at the operative end. The end effector in various embodiments may include on or more sensors used to palletize and/or depalletize heterogeneous items as disclosed herein. For example, the end effector may include image sensors used to facilitate first order picking and placing of an item and one or more force sensors to facilitate snugging items into place, e.g., adjacent to other items, sidewalls, and/or other structures. In another example, in some embodiments a suction-based end effector may include air pressure sensors to detect when a secure grasp has been made with the object surface and/or to detect when the object is losing contact or shearing off.

According to various embodiments, process 900 may be implemented in connection with determining a strategy for grasping the item, etc. The model corresponding to the item may be comprised in the plan for moving the item from the source location (e.g., the conveyor) to the destination location.

Figure 10:
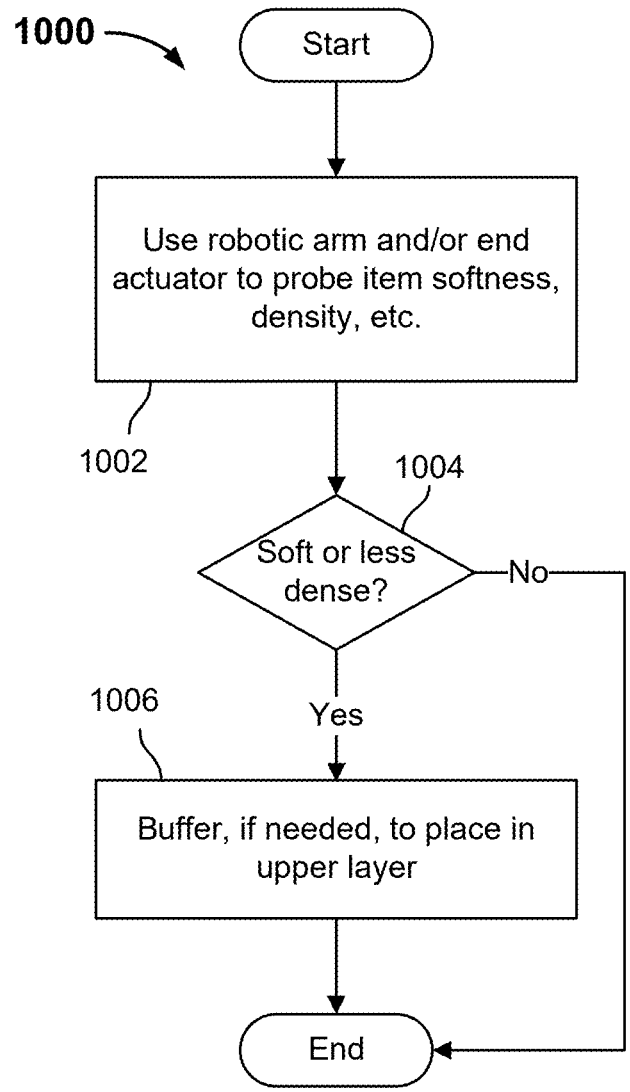
FIG. 10 is a flow chart illustrating an embodiment of a process to use a robotic arm to determine an attribute of an item to be stacked on a pallet.

FIG. 10 is a flow chart illustrating an embodiment of a process to use a robotic arm to determine an attribute of an item to be stacked on a pallet. In various embodiments, the process 1000 of FIG. 10 may be implemented by a control computer, such as control computer 118 of FIG. 1 and/or a control computer of system 400 of FIG. 4. In the example shown, at 1002 a robotic arm and/or end effector is used to probe an item to determine one or more attributes of the item, for example how soft, heavy, dense, etc., the item is. For example, if the item gives to light pressure it is determined to be soft. If the item is light for its size, as determined based on image data, the item is determined to be less dense. If at 1004 the item has been determined to be soft and/or less dense, the item is buffered at 1006, if needed, to be placed in an upper layer of the stack. Buffering the item may include moving and placing the item in the buffer or staging area at least temporarily until the system determines that a new space at which the item may be placed (e.g., based at least in part on attributes of the item such as size, type of packing, rigidity, softness, etc.). If the item is not determined at 1004 to be soft or less dense, the item is added to the stack without buffering at 1006.

Figure 11:
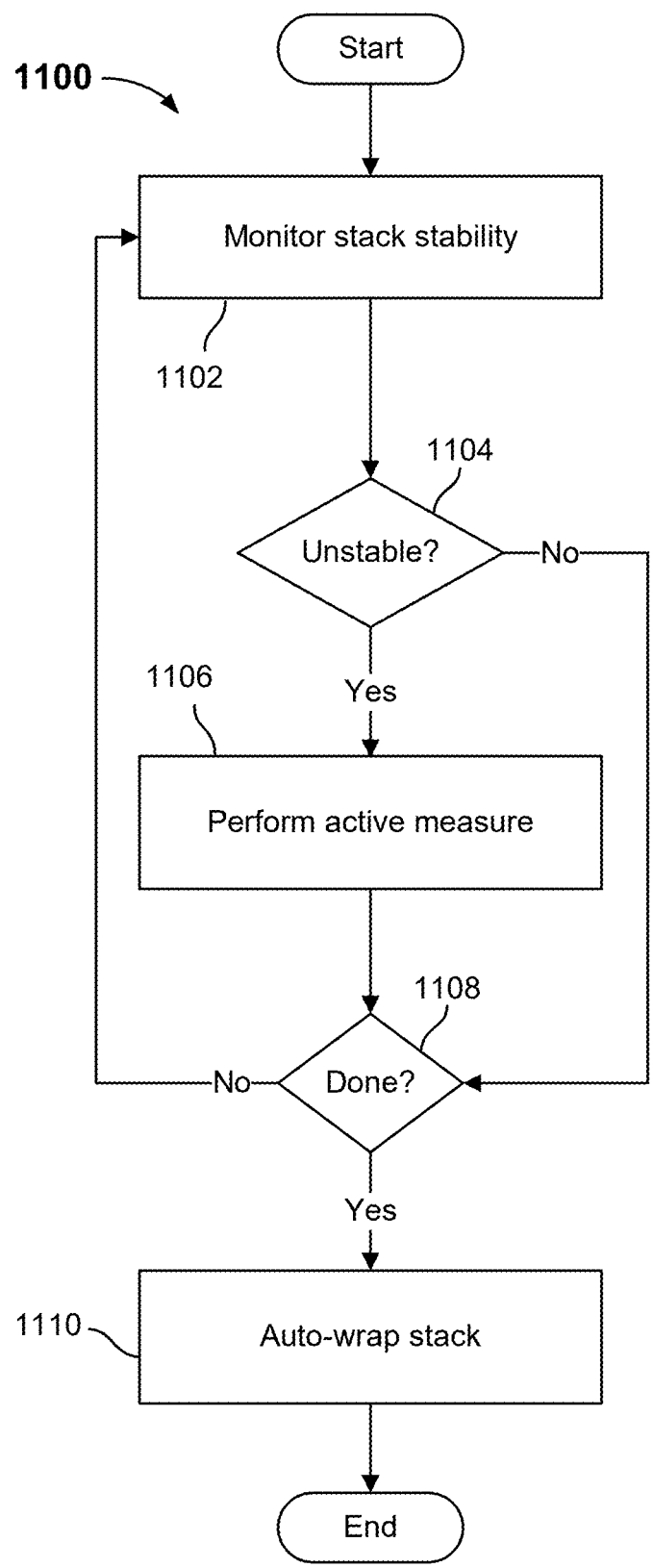
FIG. 11 is a flow chart illustrating an embodiment of a process to use a robotic arm to detect and respond to instability in a set of items as stacked on a pallet.

FIG. 11 is a flow chart illustrating an embodiment of a process to use a robotic arm to detect and respond to instability in a set of items as stacked on a pallet. In various embodiments, the process 1100 of FIG. 11 may be implemented by a control computer, such as control computer 118 of FIG. 1 and/or a control computer of system 400 of FIG. 4. In various embodiments, the process 100 is used to detect stack instability, e.g., based on internal (e.g., force) and/or external (e.g., image) sensor data.

In the example shown, stack stability is monitored at 1102. For example, cameras in the workspace/environment may be used to detect that the stack has started to lean, crumble, slide, etc. Or, force sensors on the robotic arm and/or end effector may be used to detect that the stack or a portion thereof has become unstable such as when the robotic arm is placing an item on the stack. If at 1104 it is determined the stack has become unstable, at 1106 an active measure is performed.

The active measure may improve the stability of the stack or otherwise remove an abnormality of the stack. An example of the active measure includes automatically wrapping the partial stack, e.g. in plastic, to prevent slippage and reinforce the stability and structure of the stack. Another example of the active measure includes controlling the robotic arm to remove an item that has slipped/fallen from the stack and placing the item back on the stack (in the former location that the item occupied, or a new location in which the item is determined to better fit or to correspond to improved stability of the stack), or alternatively, the robotic arm moves/places the item to a buffer or staging area until such time that the system determines that a new location at which the item is to be placed is formed (e.g., that satisfies various criteria such as satisfying one or more thresholds pertaining to fit, density, stability, etc.). Another example of the active measure includes communicating a notification to a human operator such as via sending a notification to a terminal of the human operator and displaying a notification on a user interface of the terminal to alert the human operator of the instability or abnormality.

According to various embodiments, the active measure is determined/selected based at least in part on a model of the stack. For example, the system may generate an updated model of the stack based at least in part on information obtained by a sensor in the workspace/environment. The system may determine a cause of the instability and determine a plan to remediate the instability. For example, if the system determines that the instability is caused by a particular item, the system may control the robotic arm to remove the particular item (or a set of items that includes the particular items), and restack the particular item (or at least a subset of the set of items that were removed). The system may update the models for moving/placing items based on the detected instability, etc.

If the stack is not determined (again) at 1104 to have become unstable, and in any event once the entire stack (e.g., pallet or other receptacle) has been completed (1108), the stack and/or remaining unwrapped portion thereof is wrapped automatically at 1110 and the process ends.

Figure 12:
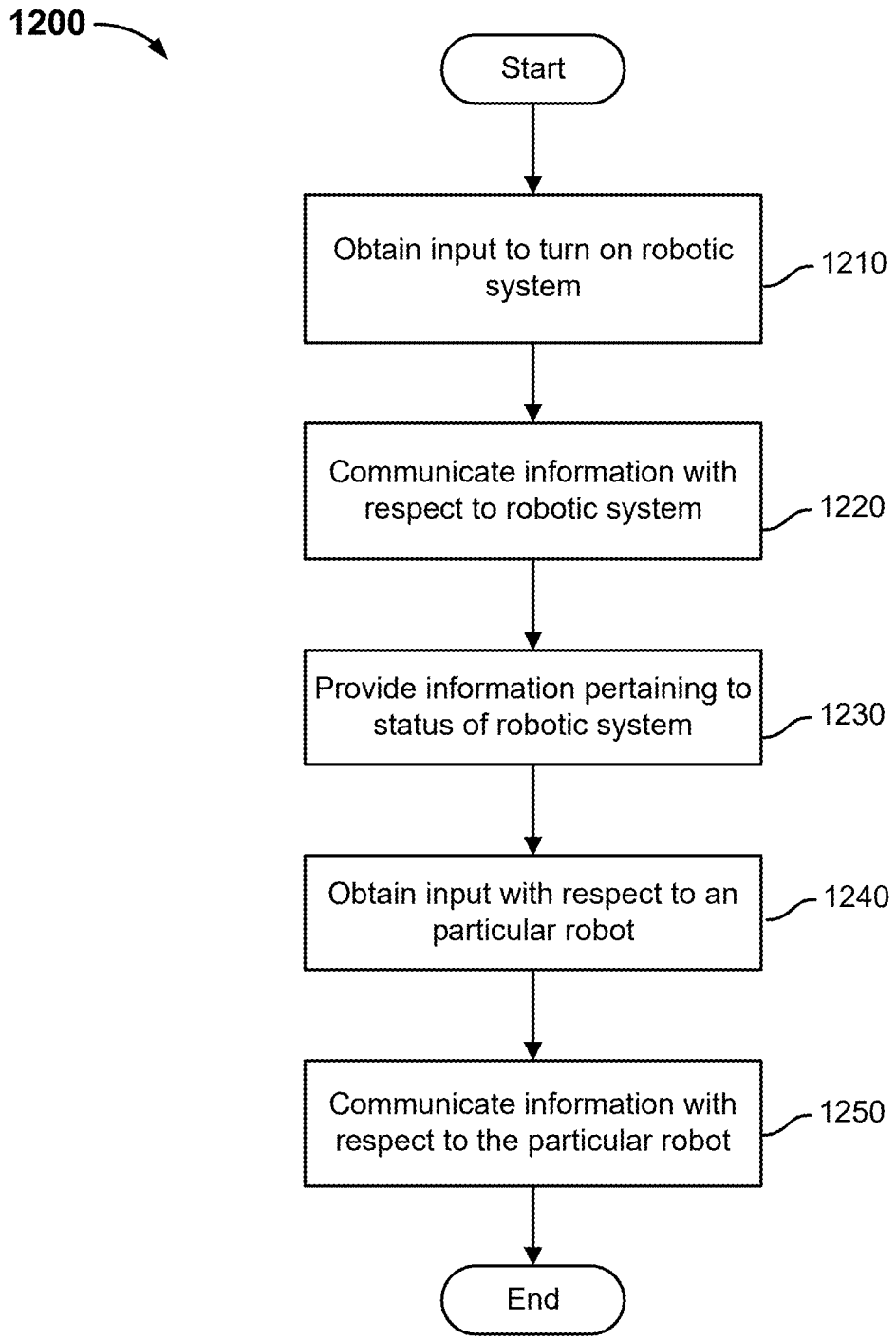
FIG. 12 is flowchart illustrating a process to control a system to palletize/depalletize an item.

FIG. 12 is flowchart illustrating a process to control a system to palletize/depalletize an item. In various embodiments, a user may control a robotic system based on information provided and/or received at a terminal operatively connected to the robotic system such as via one or more networks. Process 1200 for controlling a system to palletize/depalletize an item may be at least partly implemented by a terminal connected to system 100 of FIG. 1 and/or a terminal connected to system 400 of FIG. 4. The terminal may be a computer such as a personal computer, laptop, tablet, smartphone, etc.

At 1210, an input to turn on the robotic system is obtained. In some embodiments, the terminal receives an input from a user to activate or turn on the robotic system. The input may be received via a user interface that provides information pertaining to the robotic system such as status information of the robotic system. An example of the user interface via which the input may be received is interface 1300 of FIG. 13A.

At 1220, information is communicated with the robotic system corresponding to the input received at 1210. In some embodiments, in response to receiving the input to turn on or activate the robotic system, the terminal communicates a command to the robotic system to turn on. The command may include a specific instruction to activate a particular robot (e.g., robotic arm) of the robotic system. For example, the instruction may correspond to an instruction to turn on or activate palletization with respect to a particular predefined zone (e.g., workcell) of the robot, a set of particular predefined zones of the robot, or all the predefined zones.

In some embodiments, the communicating of information with respect to the robotic system may comprise receiving information pertaining to a status of the robotic system. The information pertaining to the status may be feedback information provided by the robotic system. For example, the information pertaining to the status may include one or more of an indication of a status with respect to completion of palletization/de-palletization of a particular manifest, information indicating one or more statistics of the robotic system or one or more robotics in the robotic system (e.g., an average number of pallets completed, an average number of items palletized/de-palletized over a predetermined period, a total number of items palletized/de-palletized over a predefined period, information regarding a status of completing palletization/de-palletization of a particular pallet, etc.), information indicating a status of one or more robots in the robotic system, etc. The information pertaining to the status may comprise information with respect to a state of a stack of items on one or more pallets. For example, the information pertaining to the status may comprise image data (e.g., an image/video captured by a sensor or camera in the workspace of the robotic system), information pertaining to the model generated with respect to a pallet or a stack of items (e.g., an image of the generated model such as a 2D and/or 3D rendering of the model), etc.

In some embodiments, the communicating of information with respect to the robotic system includes sending to the robotic system an instruction, etc., and receiving from the robotic system feedback information (e.g., state/status information), etc.

At 1230, information pertaining to the status of the robotic system is provided. According to various embodiments, the providing of information pertaining to the status of the robotic system comprises displaying at least a subset of the information pertaining to the status of the robotic system on a graphical user interface of the terminal. The information pertaining to the status of a particular robotic system may be provided on a user interface such as interface 1300 of FIG. 13A, interface 1325 of FIG. 13B, interface 1350 of FIG. 13C, and/or interface 1375 of FIG. 13D. The graphical user interface can provide one or more selectable elements with which a user may navigate the information displayed thereon such as drilling-down on information associated with a particular robot, or information associated with a particular predefined zone or pallet corresponding to a particular robot.

At 1240, an input with respect to a particular robot is received. In some embodiments, the terminal receives an input from a user to activate or turn on a particular one or more robots in the robotic system. The input may be received via a user interface that provides information pertaining to the robotic system such as status information of the robotic system. Examples the user interface via which the input may be received includes interface such as interface 1300 of FIG. 13A, interface 1325 of FIG. 13B, interface 1350 of FIG. 13C, and/or interface 1375 of FIG. 13D.

In some embodiments, the input with respect to a particular robot includes a request (e.g., a selection of an element on a graphical user interface) to obtain information regarding a status of the particular robot, performance statistics of the particular robot, a progress on palletization/depalletization of a particular robot, etc. The input with respect to the particular robot may be an input to resume palletization (e.g., after a pallet has been inserted into a predefined zone of the robot such as by the user) or an input to pause palletization (e.g., to allow a human operator or other robot to enter the predefined zone or adjacent/nearby predefined zone such as to remove a completed pallet), etc.

At 1250, information is communicated with respect to the particular robot. In some embodiments, in response to receiving the input with respect to the particular robot, the terminal communicates a command to the particular robot or to the robotic system to control the particular robot based at least in part on the input. The command may include an instruction to activate the particular robot (e.g., robotic arm) of the robotic system. For example, the instruction may correspond to an instruction to turn on or activate palletization with respect to a particular predefined zone (e.g., workcell) of the robot, a set of particular predefined zones of the robot, or all the predefined zones. As another example, the instruction may correspond to an instruction to pause or stop palletization with respect to a particular predefined zone (e.g., workcell) of the robot, a set of particular predefined zones of the robot, or all the predefined zones.

In some embodiments, the communicating of information with respect to the robot may comprise receiving information pertaining to a status of the robot. The information pertaining to the status may be feedback information provided by the robot. For example, the information pertaining to the status may include one or more of an indication of a status with respect to completion of palletization/de-palletization of a particular manifest, information indicating one or more statistics of the robot (e.g., an average number of pallets completed, an average number of items palletized/de-palletized over a predetermined period, a total number of items palletized/de-palletized over a predefined period, information regarding a status of completing palletization/de-palletization of a particular pallet, etc.), etc. The information pertaining to the status may comprise information with respect to a state of a stack of items on one or more pallets. For example, the information pertaining to the status may comprise image data (e.g., an image/video captured by a sensor or camera in the workspace of the robotic system), information pertaining to the model generated with respect to a pallet or a stack of items (e.g., an image of the generated model such as a 2D and/or 3D rendering of the model), etc.

Figure 13A:
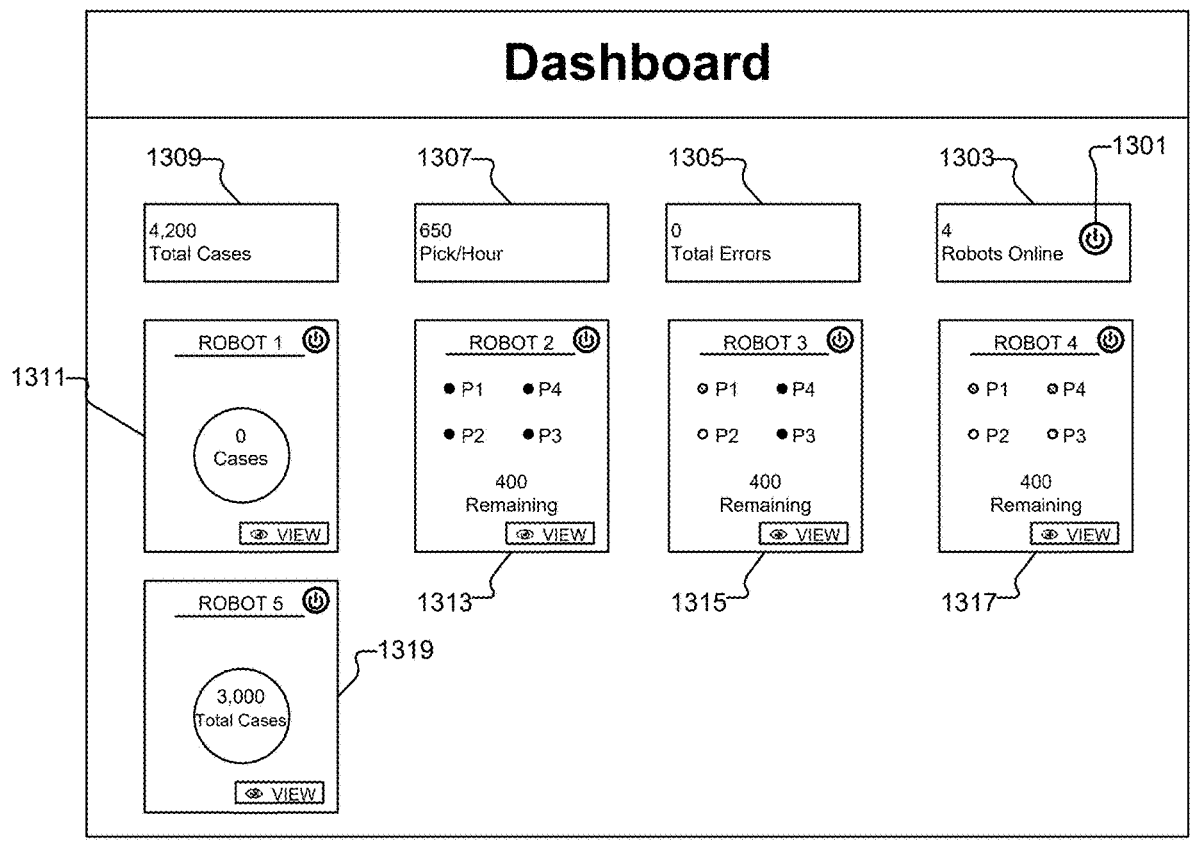
FIG. 13A is a diagram of a user interface displayed in connection with the use of a system to palletize/depalletize an item.

FIG. 13A is a diagram of a user interface displayed in connection with the use of a system to palletize/depalletize an item. In various embodiments, a user may control a robotic system based on information provided and/or received at a terminal operatively connected to the robotic system such as via one or more networks. Interface 1300 may be at least partly implemented by a terminal connected to system 100 of FIG. 1 and/or a terminal connected to system 400 of FIG. 4. In some embodiments, interface 1300 is implemented in connection with process 1200 of FIG. 12. The terminal may be a computer such as a personal computer, laptop, tablet, smartphone, etc.

Interface 1300 may display information pertaining to a robotic system. For example, interface 1300 may include one or more elements that comprise at least part of the information pertaining to the robotic system. Examples of the one or more elements include element 1303, element 1305, element 1307, and/or element 1309. As illustrated in FIG. 13A, element 1303, element 1305, element 1307, and/or element 1309 comprise information associated with a status of the robotic system, a performance of the robotic system, etc. Element 1303 may comprise element 1301 with which the robotic system may be controlled. For example, the user may turn the robotic system off/on in connection with selecting element 1301.

In some embodiments, interface 1300 provides information pertaining to one or more particular robots within the robotic system. For example, interface 1300 may provide information pertaining to each robot within the robotic system. As another example, interface 1300 may provide information pertaining to each active robot within the robotic system. As another example, interface 1300 may provide information pertaining to a set of robots and the set of robots for which interface 1300 provides information may be configurable (e.g., set by a user/administrator, etc.). In some embodiments, information provided with respect to a particular robot is provided in a window or element, such as element 1311, element 1313, element 1315, element 1317, and/or element 1317.

According to various embodiments, an element corresponding to a particular robot may include one or more selectable elements with which the robot may be controlled or with which a request to view other information pertaining to the robot may be invoked (e.g., the user may drill down to view more granular or additional details pertaining to the robot or status thereof by selecting the "view" button). As illustrated with respect to element 1311 and element 1319, information including an indication of a number of items palletized may be presented. The number of items (e.g., cases) palletized may be over a predetermined time period (such as a particular day) and/or a current number of items palletized (e.g., among the various pallets or predefined zones of the robot). As illustrated with respect to element 1313, element 1315, and/or element 1317, a status of one or more pallets of the corresponding robot may be provided. For example, with to robot 2, robot 3, and robot 4, each robot has four predefined zones in which pallets may be inserted. A status indicator with respect to each predefined zone may be provided and used in connection with communicating a status with respect to the palletizing of the items on the pallet. In some implementations, the status indicator may be a color icon, which may be presented as green if the status with respect to palletizing in the corresponding predefined zone is active (e.g., items are currently being palletized), or red if the status with respect to palletizing in the corresponding predefined zone is inactive (e.g., complete). Various other colors or status indicators may be implemented. For example, a status indicator of yellow may be used to communicate that the robot is experiencing an error at least with respect to the corresponding predefined zone (e.g., the pallet is misaligned, a stack of items therein is unstable, an item has fallen, etc.). With respect to interface 1300, the status indicators in element 1313 may indicate that all of the predefined zones P1, P2, P3, and P4 are inactive; the status indicators in element 1315 may indicate that the predefined zones P1 and P2 are active, and that the predefined ones P3 and P4 are inactive; and the status indicators in element 1317 may indicate that all of the predefined zones P1, P2, P3, and P4 are active. Further with respect to elements may include information indicating a number of items that remain to be palletized (e.g., with respect to a particular pallet, with respect to a particular manifest, etc.).

Figure 13B:
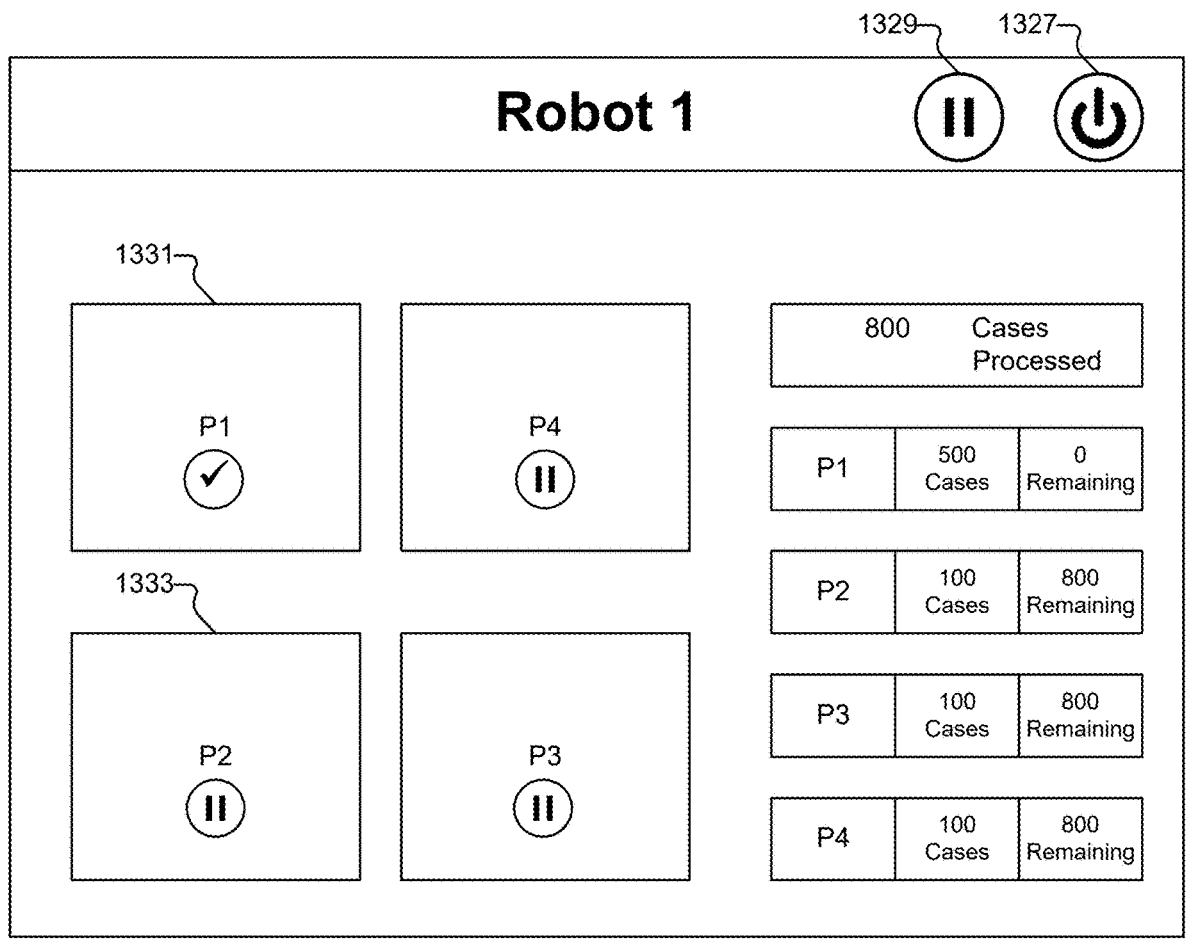
FIG. 13B is a diagram of a user interface displayed in connection with the use of a robot to palletize/depalletize an item.

FIG. 13B is a diagram of a user interface displayed in connection with the use of a robot to palletize/depalletize an item. In various embodiments, a user may control a robotic system based on information provided and/or received at a terminal operatively connected to the robotic system such as via one or more networks. Interface 1325 may be at least partly implemented by a terminal connected to system 100 of FIG. 1 and/or a terminal connected to system 400 of FIG. 4. In some embodiments, interface 1325 is implemented in connection with process 1200 of FIG. 12. The terminal may be a computer such as a personal computer, laptop, tablet, smartphone, etc.

Interface 1325 may display information pertaining to a particular robot in a robotic system. In some embodiments, interface 1325 is invoked (e.g., displayed) in response to an input from a user to view information particular to the corresponding robot (e.g., a user selecting a "view" button with respect the robot on an interface providing information with respect to a robotic system, such as selecting the "view" button on interface 1300). As an example, interface 1325 may include one or more elements with which the robot can be controlled (e.g., generally control the robotic arm with respect to all of its corresponding predefined zones, etc.). For example, interface 1325 may include element 1327 with which a user can select to turn the robot on/off. As another example, interface 1325 may include element 1329 with which a user may select to pause/resume a palletization and/or depalletization operation such as with respect to all the corresponding predefined zones or a preconfigured set of the predefined zones of the robot.

In some embodiments, interface 1325 provides functionality to the user to enable the user to control operation, or view information, with respect to a particular pallet or predefined zone in which the pallet is inserted. For example, element 1331 may be provided to enable the user to control operation of the robot with respect to the pallet in predefined zone P1 of the robot. Element 1311 may include a selectable button with which operation of the robot with respect to the pallet in predefined zone P1 may be resumed/paused. In some embodiments, 1331 may include a selectable element to invoke display of additional information pertaining to the status of predefined zone P1 and/or the palletization of items therein. For example, element 1331 may include a button that upon selection invokes display of an image (e.g., a current image/video) of the pallet in the predefined zone or of the predefined zone itself. As another example, element 1331 may include a button that upon selection invokes display of a 2D and/or 3D model of the stack of items on the pallet. As another example, element 1331 may include a button that upon selection invokes display of a detailed description of a list of items to be palletized/depalletized in the predefined zone (e.g., P1). As another example, element 1331 may include a button that upon selection invokes display of statistics pertaining to operation of the robot and/or palletization/depalletization of items in the corresponding predefined zone. Various other descriptive information pertaining to the predefined zone, the list of items corresponding to predefined zone, and state information may be provided.

Interface 1325 may further include one or more elements and/or areas in which information pertaining to a state of the palletization/depalletization of items in the corresponding predefined zones may be displayed. For example, at the right side of interface 1325, information pertaining to a number of items processed generally by the robot is provided, and information pertaining to a state of palletization/de-palletization within each predefined zone P1, P2, P3, and P4 is provided.

Element 1333 may correspond to predefined zone P2 but may otherwise correspond to, or be similar to, element 1331.

Figure 13C:
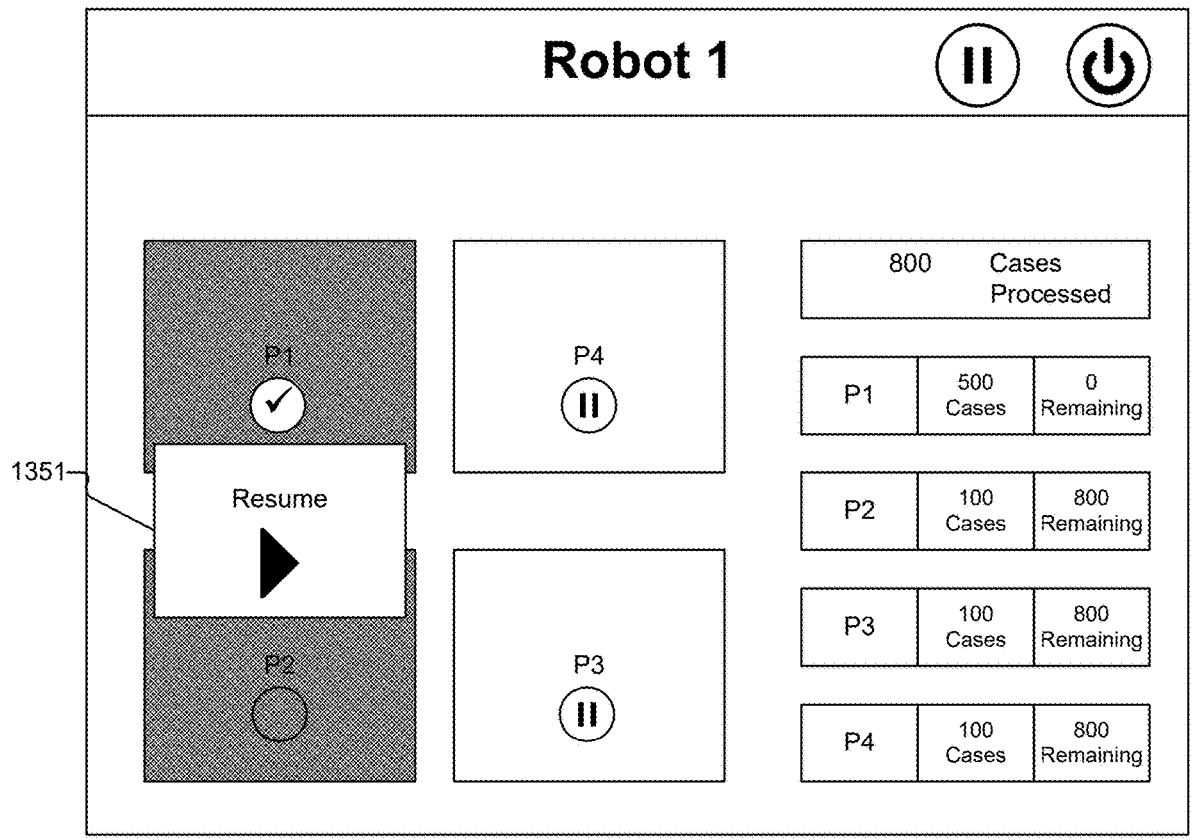
FIG. 13C is a diagram of a user interface displayed in connection with the use of a robot to palletize/depalletize an item.

FIG. 13C is a diagram of a user interface displayed in connection with the use of a robot to palletize/depalletize an item. In various embodiments, a user may control a robotic system based on information provided and/or received at a terminal operatively connected to the robotic system such as via one or more networks. Interface 1350 may be at least partly implemented by a terminal connected to system 100 of FIG. 1 and/or a terminal connected to system 400 of FIG. 4. In some embodiments, interface 1350 is implemented in connection with process 1200 of FIG. 12. The terminal may be a computer such as a personal computer, laptop, tablet, smartphone, etc.

In some embodiments, interface 1350 corresponds to interface 1325 in which the user has selected to collectively control operation of the robotic arm (e.g., palletization/de-palletization, or active/inactive status) of predefined zone P1 and P2. For example, the user may select element 1331 and element 1333 such as via a touch input. At least partially in response to selection of element 1331 and element 1333 (or of predefined zone P1 and predefined zone P20, an element 1351 may be displayed. Element 1351 may be a selectable element with which the user may control operation of the robotic arm (e.g., palletization/de-palletization, or active/inactive status) of the selected predefined zones, such as predefined zone P1 and P2 in this example. Element 1351 may be displayed as a floating window overlaid on interface 1325. In some embodiments, the layer of elements beneath element 1351 (e.g., the other elements on the interface) are displayed in less emphatic manner such as via being greyed out or otherwise less bright, etc. In some embodiments, element 1351 may be selected in connection with resuming operation of the robotic arm (e.g., palletization/de-palletization, or active/inactive status) of the selected predefined zones (e.g., in this case predefined zone P1 and P2).

Interface 1350 may display information pertaining to a particular robot in a robotic system. In some embodiments, interface 1325 is invoked (e.g., displayed) in response to an input from a user to view information particular to the corresponding robot (e.g., a user selecting a "view" button with respect the robot on an interface providing information with respect to a robotic system, such as selecting the "view" button on interface 1300). As an example, interface 1325 may include one or more elements with which the robot can be controlled (e.g., generally control the robotic arm with respect to all of its corresponding predefined zones, etc.). For example, interface 1325 may include element 1327 with which a user can select to turn the robot on/off. As another example, interface 1325 may include element 1329 with which a user may select to pause/resume a palletization and/or depalletization operation such as with respect to all the corresponding predefined zones or a preconfigured set of the predefined zones of the robot.

In some embodiments, interface 1325 provides functionality to the user to enable the user to control operation, or view information, with respect to a particular pallet or predefined zone in which the pallet is inserted. For example, element 1331 may be provided to enable the user to control operation of the robot with respect to the pallet in predefined zone P1 of the robot. Element 1311 may include a selectable button with which operation of the robot with respect to the pallet in predefined zone P1 may be resumed/paused. In some embodiments, 1331 may include a selectable element to invoke display of additional information pertaining to the status of predefined zone P1 and/or the palletization of items therein. For example, element 1331 may include a button that upon selection invokes display of an image (e.g., a current image/video) of the pallet in the predefined zone or of the predefined zone itself. As another example, element 1331 may include a button that upon selection invokes display of a 2D and/or 3D model of the stack of items on the pallet. As another example, element 1331 may include a button that upon selection invokes display of a detailed description of a list of items to be palletized/depalletized in the predefined zone (e.g., P1). As another example, element 1331 may include a button that upon selection invokes display of statistics pertaining to operation of the robot and/or palletization/depalletization of items in the corresponding predefined zone. Various other descriptive information pertaining to the predefined zone, the list of items corresponding to predefined zone, and state information may be provided.

Interface 1325 may further include one or more elements and/or areas in which information pertaining to a state of the palletization/depalletization of items in the corresponding predefined zones may be displayed. For example, at the right side of interface 1325, information pertaining to a number of items processed generally by the robot is provided, and information pertaining to a state of palletization/de-palletization within each predefined zone P1, P2, P3, and P4 is provided.

Figure 13D:
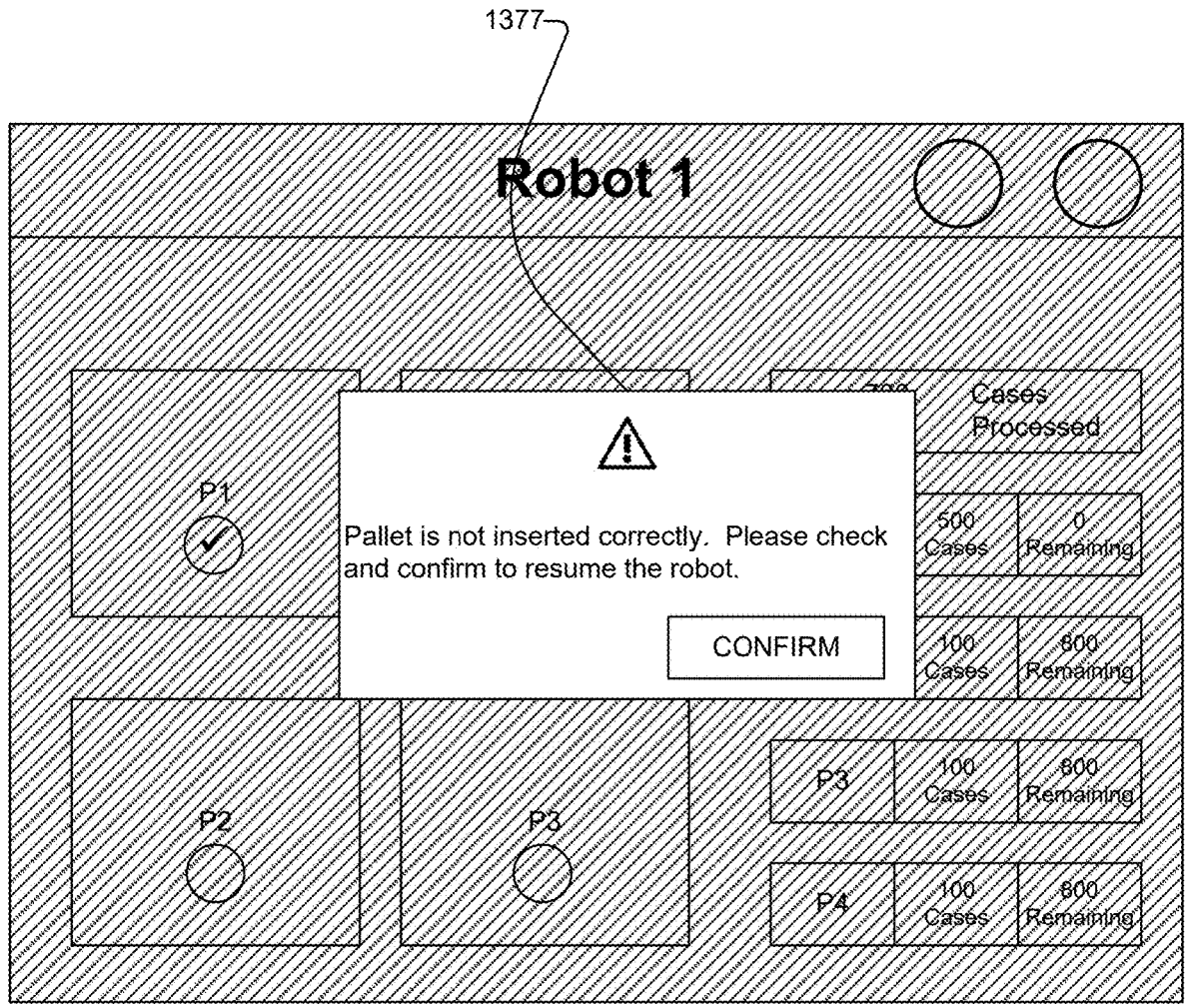
FIG. 13D is a diagram of a user interface displayed in connection with the use of a robot to palletize/depalletize an item.

FIG. 13D is a diagram of a user interface displayed in connection with the use of a robot to palletize/depalletize an item.

In various embodiments, a user may control a robotic system based on information provided and/or received at a terminal operatively connected to the robotic system such as via one or more networks. Interface 1375 may be at least partly implemented by a terminal connected to system 100 of FIG. 1 and/or a terminal connected to system 400 of FIG. 4. In some embodiments, interface 375 is implemented in connection with process 1200 of FIG. 12. The terminal may be a computer such as a personal computer, laptop, tablet, smartphone, etc.

According to various embodiments, an alert or notification may be provided to a user via an interface such as an interface via which the user may view a status of the robotic system and/or control operation of the robotic system. In the event that the robotic system detects an abnormality or problem. Abnormalities or problems may include an instability with respect to the stack of items on the pallet, an item that has fallen from the pallet, a human or other robot (or other unexpected object), detected in a predefined zone while the predefined zone is active, a misaligned pallet or incorrect insertion of the pallet, an error with respect to an input conveyor, an item that cannot be identified, an item that does not correspond to an item on a manifest for which the robot is palletizing/depalletizing or a completed stack awaiting removal by a human operator or other robot (e.g., a stack that has just been completed, a stack that has been completed for at least a threshold period of time, etc.).

In some embodiments, interface 1375 corresponds to interface 1325 of FIG. 3B with notification 1377 and in response to determining that a notification/alert is to be provided to the user, element 1377 may be displayed. Element 1375 may be displayed as a floating window overlaid on interface 1325. In some embodiments, the layer of elements beneath element 1377 (e.g., the other elements on the interface) are displayed in less emphatic manner such as via being greyed out or otherwise less bright, etc. In some embodiments, element 1377 may be dismissed by a user such as via inputting a selection of a confirm button, etc.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A robotic system, comprising:
a communication interface; and
one or more processors coupled to the communication interface and configured to:
receive, via the communication interface, data associated with a plurality of items to be stacked on or in a destination location;
detect a state of a platform or receptacle placed in at least one zone included in a plurality of predefined zones within a workspace for a robotic arm;
in response to determining, based on the state, that the at least one zone does not have a properly aligned platform or receptable to which items are to be placed, implement an active measure in connection with correcting the state;
generate based at least in part on the received data a plan to stack the items on or in the destination location, including by for each item: determining the destination location based at least in part on a characteristic associated with the item, and at least one of (i) a characteristic of a platform or receptacle on which one or more items are to be stacked, and (ii) an existing stack of one or more items on the platform or receptacle, wherein:
the determining the destination location includes: determining a set of possible destination locations for placing a corresponding item, simulating placements for the set of possible destination locations, determining for at least one of the set of possible destination locations an expected packing metric based at least in part on the simulating of a placement of the at least one possible destination location, and selecting a selected destination location from the set of possible destination locations based at least in part on a determination that the expected packing metric satisfies a threshold value;
the set of possible destination locations comprise at least (i) a first destination location on a first platform or receptacle in a first zone of the plurality of zones, and (ii) a second destination location on a second platform or receptacle in a second zone of the plurality of zones;
the first platform or receptable and the second platform or receptacle are associated with a first downstream location; and
the destination location is determined from among a plurality of zones in which platforms or receptacles are disposed; and
implement the plan at least in part by controlling the robotic arm to pick up to the items and stack the items on or in the destination location according to the plan.

2. The robotic system of claim 1, wherein to implement the plan includes for each item:
using one or more first order sensors to move the item to a first approximation of a destination position for that item at the destination location; and
using one or more second order sensors to snug the item into a final position.

3. The robotic system of claim 1, wherein:
the plurality of items are moved to within range of the robotic arm via one or more input conveyors; and
the robotic arm respectively picks the plurality of items from the one or more input conveyors and respectively stacks the plurality of items in corresponding destination locations.

4. The robotic system of claim 3, wherein:
the robotic arm stacks a first subset of the plurality of items on a first platform or receptacle; and
the robotic arm stacks a second subset of the plurality of items on a second platform or receptacle.

5. The robotic system of claim 4, wherein the first platform or receptacle and the second platform or receptacle respectively comprise stacks of one or more items.

6. The robotic system of claim 5, wherein the robotic arm contemporaneously or concurrently places a subset of the plurality of items on the first platform or receptacle and the second platform or receptacle.

7. The robotic system of claim 4, wherein the first platform or receptacle and the second platform or receptacle respectively comprise stacks of one or more items.

8. The robotic system of claim 1, wherein:
detecting the state comprises determining whether a platform or receptacle placed in a corresponding zone is aligned; and
implementing the active measure comprises in response to a determination that the platform or receptacle placed in the corresponding zone is not properly aligned, implement the active measure in connection with correcting alignment of the platform or receptacle.

9. The robotic system of claim 8, wherein the active measure comprises providing a notification to a terminal, the notification indicating that human intervention is needed to correct alignment of the platform or receptacle.

10. The robotic system of claim 8, wherein to determine whether a platform or receptacle placed in a corresponding zone is aligned includes determining whether the platform or receptacle is within a range of motion of the robotic arm.

11. The robotic system of claim 10, wherein the range of motion of the robotic arm is defined based at least in part on a range within which the robotic arm operates while stacking one or more items on the platform or receptacle.

12. The robotic system of claim 1, wherein the one or more processors are further configured to:
for each item stacked on or in the destination location, store an association between the item and the platform or receptacle on which the item is stacked.

13. The robotic system of claim 12, wherein the platform or receptacle on which the item is stacked is associated with a manifest or order.

14. The robotic system of claim 1, wherein the one or more processors are further configured to:
determine that a stack of items on a platform or receptacle is complete; and
in response to a determination that the stack is complete, providing a notification to a terminal.

15. The robotic system of claim 1, wherein the one or more processors are further configured to:
receiving an indication that a platform or receptacle comprising a completed stack of items is to be removed from the corresponding zone; and
in response to receiving the indication, updating the plan to stack the items so that the robotic arm does not stack items in at least the corresponding zone while the completed stack is removed.

16. The robotic system of claim 15, wherein:
the indication is received, via the communication interface, from a terminal in communication with the robotic system; and the indication is generated in response to a user requesting to pause stacking items in at least the corresponding zone.

17. The robotic system of claim 15, wherein the updating the plan to stack the items includes restricting stacking one or more items in at least one zone adjacent to the zone from which the platform or receptacle is to be removed.

18. The robotic system of claim 1, wherein the one or more processors are further configured to:
obtain a characteristic associated with the item, wherein:
the characteristic comprising one or more of an identifier, a dimension, a material, and a weight; and
the characteristic is obtained based at least in part on information obtained from one or more sensors operatively connected to the one or more processors.

19. The robotic system of claim 1, wherein the selected destination location corresponds to a location corresponding to palletizing maximization.

20. The robotic system of claim 1, wherein the destination location is determined based at least in part on one or characteristics associated with one or more upstream items.

21. The robotic system of claim 1, wherein the one or more processors are further configured to:
determine that a new platform or receptacle has been placed in a corresponding zone; and
in response to a determination that a new platform or receptacle has been placed in the corresponding zone, perform a calibration with respect to an alignment of the new platform or receptacle, the calibration being performed based at least in part on information obtained from one or more sensors operatively connected to the one or more processors.

22. The robotic system of claim 1, wherein
detecting the state of the at least one zone comprises detecting that a human has entered the at least one zone; and
implementing the active measure comprises causing operation of the robotic arm to pause while the human is within the at least one zone.

23. A method to control a robot, comprising:
receiving, via the communication interface, data associated with a plurality of items to be stacked on or in a destination location;
detect a state of a platform or receptacle placed in at least one zone included in a plurality of predefined zones within a workspace for a robotic arm;
in response to determining, based on the state, that the at least one zone does not have a properly aligned platform or receptacle to which items are to be placed, implementing an active measure in connection with correcting the state;
generating, by one or more processors, a plan to stack the items on or in the destination location, the plan being generated based at least in part on the received data, and the generation of the plan for each item comprising: determining the destination location based at least in part on a characteristic associated with the item, and at least one of (i) a characteristic of a platform or receptacle on which one or more items are to be stacked, and (ii) an existing stack of one or more items on the platform or receptacle, wherein:
the determining the destination location includes:
determining a set of possible destination locations for placing a corresponding item, simulating placements for the set of possible destination locations, determining for at least one of the set of possible destination locations an expected packing metric based at least in part on the simulating of a placement of the at least one possible destination location, and selecting a selected destination location from the set of possible destination locations based at least in part on a determination that the expected packing metric satisfies a threshold value;
the set of possible destination locations comprise at least (i) a first destination location on a first platform or receptacle in a first zone of the plurality of zones, and (ii) a second destination location on a second platform or receptacle in a second zone of the plurality of zones;
the first platform or receptable and the second platform or receptacle are associated with a first downstream location; and
the destination location is determined from among a plurality of zones in which platforms or receptacles are disposed; and
implementing the plan at least in part by controlling the robotic arm to pick up to the items and stack the items on or in the destination location according to the plan.

24. A computer program product to control a robot, the computer program product being embodied in a non-transitory computer readable medium and comprising computer instructions for:
receiving, via the communication interface, data associated with a plurality of items to be stacked on or in a destination location;
detect a state of a platform or receptacle placed in at least one zone included in a plurality of predefined zones within a workspace for a robotic arm;
in response to determining, based on the state, that the at least one zone does not have a properly aligned platform or receptacle to which items are to be placed, implementing an active measure in connection with correcting the state;
generating, by one or more processors, a plan to stack the items on or in the destination location, the plan being generated based at least in part on the received data, and the generation of the plan for each item comprising: determining the destination location based at least in part on a characteristic associated with the item, and at least one of (i) a characteristic of a platform or receptacle on which one or more items are to be stacked, and (ii) an existing stack of one or more items on the platform or receptacle, wherein:
the determining the destination location includes:
determining a set of possible destination locations for placing a corresponding item, simulating placements for the set of possible destination locations, determining for at least one of the set of possible destination locations an expected packing metric based at least in part on the simulating of a placement of the at least one possible destination location, and selecting a selected destination location from the set of possible destination locations based at least in part on a determination that the expected packing metric satisfies a threshold value;
the set of possible destination locations comprise at least (i) a first destination location on a first platform or receptacle in a first zone of the plurality of zones, and (ii) a second destination location on a second platform or receptacle in a second zone of the plurality of zones;

the first platform or receptable and the second platform or receptacle are associated with a first downstream location; and the destination location is determined from among a plurality of zones in which platforms or receptacles are disposed; and implementing the plan at least in part by controlling the robotic arm to pick up to the items and stack the items on or in the destination location according to the plan.

* * * * *